United States Patent
King et al.

(10) Patent No.: US 11,104,332 B2
(45) Date of Patent: Aug. 31, 2021

(54) COLLISION AVOIDANCE SYSTEM WITH TRAJECTORY VALIDATION

(71) Applicant: Zoox, Inc., Foster City, CA (US)

(72) Inventors: Andrew Lewis King, Los Altos, CA (US); Jefferson Bradfield Packer, San Francisco, CA (US); Robert Edward Somers, Sunnyvale, CA (US); Marc Wimmershoff, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 128 days.

(21) Appl. No.: 16/218,182

(22) Filed: Dec. 12, 2018

(65) Prior Publication Data

US 2020/0189573 A1 Jun. 18, 2020

(51) Int. Cl.
*B60W 30/09* (2012.01)
*B60R 21/0134* (2006.01)
(Continued)

(52) U.S. Cl.
CPC ......... *B60W 30/09* (2013.01); *B60R 21/0134* (2013.01); *B60W 30/0953* (2013.01);
(Continued)

(58) Field of Classification Search
CPC ............. B60W 30/09; B60W 30/0953; B60W 30/0956; B60R 21/0134; G05D 1/0077;
(Continued)

(56) References Cited

U.S. PATENT DOCUMENTS

| 6,226,389 B1 * | 5/2001 | Lemelson | G01S 19/11 |
| | | | 382/104 |
| 6,393,362 B1 * | 5/2002 | Burns | G05D 1/0278 |
| | | | 340/940 |

(Continued)

FOREIGN PATENT DOCUMENTS

| RU | 2012126033 A | 12/2013 |
| WO | WO2017079349 A1 | 5/2017 |
| WO | WO2018156451 A1 | 8/2018 |

OTHER PUBLICATIONS

Karl Berntorp, "Path Planning and Integrated Collision Avoidance for Autonomous Vehicles", 2017, all pages URL: https://ieeexplore.ieee.org/stamp/stamp.jsp?tp=&arnumber=7963572 (Year: 2017).*

(Continued)

*Primary Examiner* — Calvin Cheung
(74) *Attorney, Agent, or Firm* — Lee & Hayes, P.C.

(57) ABSTRACT

A vehicle may include a primary system and a secondary system to validate operation of the primary system and to control the vehicle to avoid collisions. For example, the secondary system may receive multiple trajectories from the primary system, such as a primary trajectory and a secondary, contingent, trajectory associated with a deceleration or other maneuver. The secondary system may determine if a trajectory is associated with a potential collision, if the trajectory is consistent with a current or previous pose, if the trajectory is compatible with a capability of the vehicle, etc. The secondary system may select the primary trajectory if valid, the secondary trajectory if the primary trajectory is (Continued)

invalid, or another trajectory generated by the secondary system if the primary trajectory and the secondary trajectory are invalid. If no valid trajectory is determined, the vehicle may decelerate at a maximum rate.

20 Claims, 9 Drawing Sheets

(51) Int. Cl.
- *B60W 30/095* (2012.01)
- *G05D 1/00* (2006.01)
- *G05D 1/02* (2020.01)
- *G08G 1/16* (2006.01)

(52) U.S. Cl.
CPC ....... *B60W 30/0956* (2013.01); *G05D 1/0077* (2013.01); *G05D 1/0223* (2013.01); *G08G 1/166* (2013.01); *G05D 2201/0213* (2013.01)

(58) Field of Classification Search
CPC ......... G05D 1/0223; G05D 2201/0213; G08G 1/166

See application file for complete search history.

(56) References Cited

U.S. PATENT DOCUMENTS

| | | | |
|---|---|---|---|
| 9,630,619 B1* | 4/2017 | Kentley | G01S 5/16 |
| 9,731,729 B2 | 8/2017 | Solyom et al. | |
| 10,235,882 B1 | 3/2019 | Aoude et al. | |
| 10,324,463 B1* | 6/2019 | Konrardy | G08G 5/0069 |
| 2007/0080825 A1* | 4/2007 | Shiller | G08G 1/164 340/903 |
| 2008/0312832 A1 | 12/2008 | Greene et al. | |
| 2009/0299593 A1 | 12/2009 | Borchers | |
| 2010/0292871 A1* | 11/2010 | Schultz | G01S 13/867 701/3 |
| 2014/0074388 A1 | 3/2014 | Bretzigheimer et al. | |
| 2016/0163198 A1* | 6/2016 | Dougherty | G08G 1/162 340/905 |
| 2016/0339910 A1* | 11/2016 | Jonasson | G05D 1/0061 |
| 2017/0069214 A1 | 3/2017 | Dupray et al. | |
| 2018/0261093 A1 | 9/2018 | Xu et al. | |
| 2018/0348767 A1* | 12/2018 | Jafari Tafti | G08G 1/163 |
| 2018/0373252 A1 | 12/2018 | Steiner et al. | |
| 2019/0079529 A1 | 3/2019 | Kamata | |
| 2019/0086916 A1* | 3/2019 | Choi | B60W 50/087 |
| 2019/0111921 A1* | 4/2019 | Hehn | G08G 1/166 |
| 2019/0250617 A1* | 8/2019 | Ford | B60W 50/0097 |
| 2019/0250622 A1 | 8/2019 | Nister et al. | |
| 2019/0283423 A1 | 8/2019 | Wakabayashi et al. | |
| 2020/0117206 A1 | 4/2020 | Egnor et al. | |
| 2020/0148201 A1 | 5/2020 | King et al. | |
| 2020/0160535 A1 | 5/2020 | Ali Akbarian et al. | |
| 2020/0211394 A1 | 7/2020 | King et al. | |

OTHER PUBLICATIONS

U.S. Appl. No. 15/622,905, filed Jun. 14, 2017, Douillard, et al., "Voxel Based Ground Plane Estimation and Object Segmentation", 74 pages.

U.S. Appl. No. 15/820,245, filed Nov. 21, 2017, Pfeiffer, et al., "Sensor Data Segmentation", pp. 70.

U.S. Appl. No. 15/833,715, filed Dec. 6, 2017, Kobilarov, et al., "Trajectory Prediction of Third-Party Objects Using Temporal Logic and Tree Search", 92 pages.

U.S. Appl. No. 16/189,726, filed Nov. 13, 2018, King, et al., "Perception Collision Avoidance", 53 pages.

The PCT Search Report and Written Opinion dated Apr. 20, 2020 for PCT Application No. PCT/US2019/067276, 11 pages.

The PCT Search Report and Written Opinion dated Apr. 3, 2020 for PCT Application No. PCT/US2019/065165, 27 pages.

The PCT Search Report and Written Opinion dated Mar. 12, 2020 for PCT Application No. PCT/US2019/060085, 9 pages.

Non Final Office Action dated Nov. 30, 2020 for U.S. Appl. No. 16/232,863, "Collision Avoidance System", King, 28 pages.

Office Action for U.S. Appl. No. 16/232,863, dated Mar. 17, 2021, King, "Collision Avoidance System", 28 pages.

Office Action for U.S. Appl. No. 16/189,726, dated Mar. 18, 2021, King, "Perception Collision Avoidance", 18 pages.

\* cited by examiner

COLLISION AVOIDANCE SYSTEM WITH TRAJECTORY VALIDATION

BACKGROUND

Safety of passengers in a vehicle and other people or objects in proximity to the vehicle is of the upmost importance. Such safety is often predicated on an accurate detection of a potential collision and timely deployment of a safety measure. While autonomous vehicles are often implemented with systems that have highly effective collision detection systems, these systems may be inoperable or ineffective on rare occasions. For instance, an error may be introduced into a relatively long processing pipeline for a system on a vehicle, causing the system to generate a trajectory that collides with an object and/or causes the vehicle to maneuver in a manner that is not possible or is unacceptable given the current pose of the vehicle and/or capabilities of the vehicle. As such, the system may not operate as effectively as desired, which may result in unsafe behavior.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
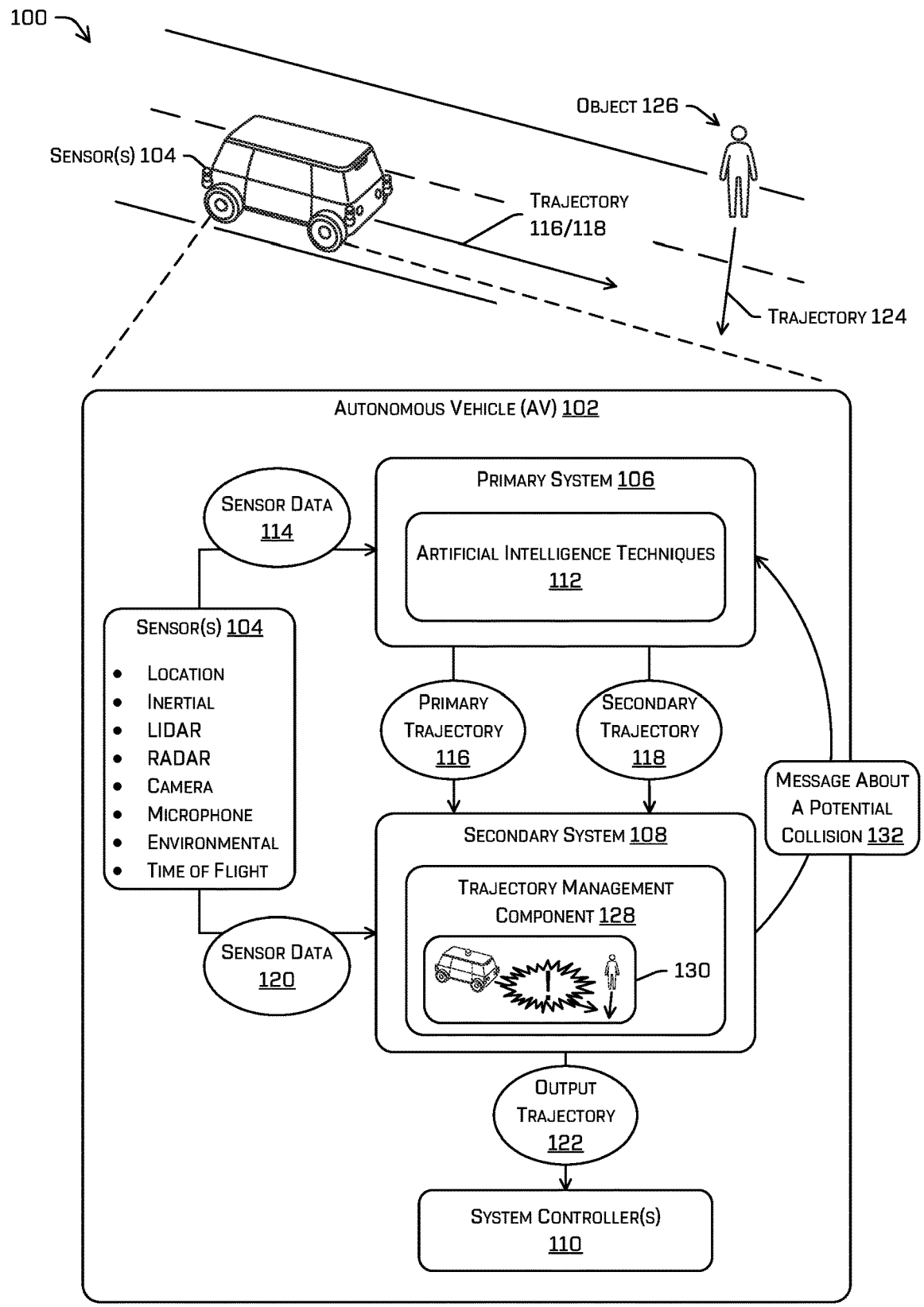
FIG. 1 illustrates an example environment in which the techniques discussed herein may be implemented.

This disclosure is directed to a vehicle including a primary system for controlling the vehicle and a secondary system that operates on the vehicle to validate operation of the primary system and to control the vehicle to avoid collisions. For example, the secondary system may receive multiple trajectories from the primary system, such as a primary trajectory and a secondary trajectory (e.g., a contingent trajectory associated with a deceleration or other maneuver). The secondary system may validate each trajectory (e.g., determine if an error exists). For instance, the secondary system may determine if a trajectory generated by the primary system is associated with a potential collision, if the trajectory is consistent with a current or previous pose of the vehicle, if the trajectory is compatible with a capability of the vehicle, etc. If a primary trajectory is valid, the secondary system may control the vehicle according to the primary trajectory. If the primary trajectory is invalid, and a secondary trajectory is valid, the secondary system may control the vehicle according to the secondary trajectory. If the primary trajectory and the secondary trajectory are both invalid, the secondary system may use another trajectory to control the vehicle, such as a trajectory to decelerate along the second trajectory or perform another maneuver. In examples, if the secondary system detects that the primary trajectory will cause a collision in the future, the secondary system may send a message to the primary system indicating such situation. This may provide the primary system with an opportunity to adjust the primary trajectory to avoid any such predicted collisions.

The primary system may generally perform processing to control how the vehicle maneuvers within an environment. The primary system may implement various Artificial Intelligence (AI) techniques, such as machine learning, to understand an environment around the vehicle and/or instruct the vehicle to move within the environment. For example, the primary system may implement the AI techniques to localize the vehicle, detect an object around the vehicle, segment sensor data, determine a classification of the object, predict an object track, generate a trajectory for the vehicle, and so on. In one example, the primary system generates a primary trajectory for controlling the vehicle and a secondary, contingent trajectory for controlling the vehicle, and provides the primary trajectory and the secondary trajectory to the secondary system. The contingent trajectory may control the vehicle to come to a stop and/or to perform another maneuver (e.g., lane change, etc.).

The secondary system may generally evaluate the primary system using at least a subset of data (e.g., sensor data) made available to the primary system. For example, the secondary system may independently localize the vehicle by determining a position and/or orientation (together a pose) of the vehicle relative to a point and/or object in an environment where the vehicle is located. The secondary system may also independently detect an object around the vehicle and/or predict a trajectory for the object. The secondary system may use the pose of the vehicle and/or the predicted trajectory for the object to evaluate a trajectory of the vehicle provided by the primary system and determine if the trajectory should be used to control the vehicle. Such localizations and/or detections may use similar techniques as used in the primary system so as to verify the outputs thereof and/or use dissimilar techniques to ensure consistency and verifiability of such outputs.

To evaluate a trajectory of the vehicle, the secondary system may perform one or more operations to evaluate (or validate) the trajectory. For example, the secondary system may check to see if a trajectory was generated less than a threshold amount of time ago, if the trajectory is consistent with a current or previous pose of the vehicle (e.g., the trajectory controls the vehicle to be positioned at a location that is possible given the current pose of the vehicle), if the trajectory is compatible with a capability of the vehicle (e.g., steering limits, acceleration limits, etc.), and so on. Further, the secondary system may check to see if a trajectory is associated with a collision. For example, the secondary system may check to see if a trajectory of the vehicle provided by the primary system intersects with a trajectory of an object determined by the secondary system and if the object and the vehicle meet at the intersection at the same time (or a window of time). That is, the secondary system may determine if the vehicle would collide with an object if the vehicle is maintained along the trajectory provided by the primary system. Such collision checking may be based on either one or more of direct kinematic assumptions of travel and/or predictions of motion as determined by one or more additional techniques.

In examples, the secondary system may evaluate each trajectory of a vehicle that is provided by the primary system. For instance, the secondary system may evaluate a primary trajectory that is generated by the primary system (e.g., a highest level trajectory) and a secondary trajectory that is generated by the primary system (e.g., a next highest level trajectory). The secondary trajectory may be a contingent trajectory that may be used in cases where the primary trajectory is invalid. Further, in examples, the secondary system may generate a tertiary trajectory for the vehicle (e.g., a next highest level trajectory) and evaluate the tertiary trajectory. The tertiary trajectory may be a further contingent trajectory that may be used in cases where the primary and secondary trajectories are invalid. The tertiary trajectory may cause the vehicle to come to a stop along the secondary trajectory (or the primary trajectory, in some cases) or to perform another maneuver (e.g., lane change, swerve, etc.). In some examples, the tertiary trajectory may be determined based at least in part on minimal modifications of the secondary trajectory (modifications to longitudinal accelerations, steering angles, lateral accelerations, and the like).

The secondary system may determine a trajectory to use to control the vehicle based on an evaluation of the trajectory. For example, the secondary system may select a primary trajectory provided by the primary system if a state of the primary trajectory indicates that the primary trajectory is collision free or is associated with a collision in the "far" future (e.g., the primary trajectory is temporarily valid). Further, the secondary system may select a secondary trajectory provided by the primary system if the primary trajectory is associated with a state indicating that a collision is imminent and the secondary trajectory is associated with a state indicating that the secondary trajectory is collision free. Moreover, the secondary system may select a tertiary trajectory generated by the secondary system if the primary trajectory is associated with a state indicating that a collision is imminent and the secondary trajectory is associated with a state indicating a collision. Upon selecting a trajectory, the secondary system may send a signal to a system controller to cause the vehicle to be controlled based on the trajectory. In at least some examples, where no trajectory is collision free, the secondary system may cause the vehicle to perform one or more operations, such as, for example, engaging an emergency brake and/or pre-tensioning seatbelts, etc.

In examples, the secondary system may maintain control of the vehicle based on a selected trajectory until a signal is received to release control from the selected trajectory. For example, the secondary system may transition to a lower level trajectory at any time, if needed, and refrain from transitioning back to a higher level trajectory until a signal is received to release control to a higher level trajectory. To illustrate, if the secondary system selects a secondary trajectory due to a primary trajectory being associated with a collision, control of the vehicle may be maintained along the secondary trajectory (or an even lower level trajectory) until a signal is received from a teleoperations system (e.g., system associated with an operator) to release control to a higher level trajectory. By doing so, the vehicle may avoid frequent changes between trajectories.

Further, in examples, the secondary system may provide a message to the primary system indicating an error with a trajectory provided by the primary system. For example, if the secondary system determines that a collision is estimated to occur far enough in the future that the vehicle does not need to brake immediately (e.g., more than a threshold amount of time away) if the vehicle proceeds along a primary trajectory provided by the primary system, the secondary system may send a message to the primary system to warn the primary system. This may allow the primary system to adjust the primary trajectory before the collision occurs.

In examples, the techniques and/or systems discussed herein may enhance safety of passengers in a vehicle and/or other individuals in proximity to the vehicle. For example, a secondary system may detect an error in a trajectory provided by a primary system and control a vehicle to safely decelerate, stop, and/or perform another maneuver to avoid a collision. In examples, the secondary system may operate relatively independent from the primary system, so that another form of evaluation occurs to avoid a collision. For instance, the secondary system may independently detect an object in proximity to the vehicle and/or evaluate a trajectory generated by the primary system. Further, in examples, the secondary system may be a higher integrity (e.g., more verifiable) and/or less complex system than the primary system. For instance, the secondary system may be designed to process less data, include a shorter processing pipeline than the primary system, operate according to techniques that are more easily verifiable than the techniques of the primary system, and so on.

In examples, the techniques discussed herein may implement the techniques discussed in U.S. patent application Ser. No. 16/189,726, filed Nov. 11, 2018, and entitled "Perception Collision Avoidance," the entire contents of which are incorporated herein by reference.

The methods, apparatuses, and systems described herein may be implemented in a number of ways. Example implementations are provided below with reference to the following figures. Although discussed in the context of an autonomous vehicle, in some examples, the methods, apparatuses, and systems described herein may be applied to a variety of systems. In another example, the methods, apparatuses, and systems may be utilized in an aviation or nautical context. Additionally, or alternatively, the techniques described herein may be used with real data (e.g., captured using sensor(s)), simulated data (e.g., generated by a simulator), or any combination thereof.

FIG. 1 illustrates an example environment 100 in which the techniques discussed herein may be implemented. The example environment 100 shows an autonomous vehicle 102 that includes a sensor(s) 104, a primary system 106, a secondary system 108, and a system controller(s) 110. The primary system 106 may generally implement artificial intelligence (e.g., AI techniques 112) to perform a variety of operations, and the secondary system 108 may generally implement different techniques to evaluate the primary system 106 and take over control, if needed. For example, the primary system 106 processes sensor data 114 from the sensor(s) 104 to generate a primary trajectory 116 and a secondary trajectory 118. The primary system 106 may send the primary trajectory 116 and the secondary trajectory 118 to the secondary system 108. The secondary system 108 may process sensor data 120 from the sensor(s) 104 to evaluate the primary trajectory 116 and/or the secondary trajectory 118. As above, techniques performed by the secondary system 108 may comprise similar techniques as those employed by the primary system 106 and results may be compared to determine similarity. In some examples, the secondary system 108 may use dissimilar techniques as those in the primary system 106 such that similar results may be indicative of a correct functioning of both systems. Based on the evaluation, the secondary system 108 may select an output trajectory 122 and send the output trajectory 122 to the system controller(s) 110 to control the autonomous vehicle 102. The output trajectory 122 may include the primary trajectory 116, the secondary trajectory 118, and/or another trajectory, such as a trajectory that is generated by the secondary system 108, as discussed in detail below.

Although many of the techniques are discussed in the context of the secondary system 108 sending a signal to the system controller(s) 110 (e.g., sending the output trajectory 122), the primary system 106 may alternatively, or additionally, send a signal to the system controller(s) 110, in some cases.

The sensor(s) 104 may include a variety of sensors, such as light detection and ranging (LIDAR) sensors, RADAR sensors, ultrasonic transducers, sonar sensors, location sensors (e.g., global navigation satellite system (GNSS) (including global positioning systems (GPS)), compass, etc.), inertial sensors (e.g., inertial measurement units (IMUs), accelerometers, magnetometers, gyroscopes, etc.), cameras (e.g., red-green-blue (RGB), infrared (IR), intensity, depth, etc.), time of flight sensors, microphones, wheel encoders, environment sensors (e.g., temperature sensors, humidity sensors, light sensors, pressure sensors, etc.), etc.

As noted above, the primary system 106 may generally process the sensor data 114 and the secondary system 108 may process the sensor data 120. In some examples, the sensor data 120 includes a subset of the sensor data 114. To illustrate, the sensor data 114 may include data from a wide variety of the sensor(s) 104, such as location data, inertial data, LIDAR data, RADAR data, image data, audio data, environmental data, depth data, etc. Meanwhile, the sensor data 120 may include data from a more limited set of the sensor(s) 104, such as LIDAR data, RADAR data, and/or time of flight data. In other examples, the sensor data 120 includes the same or more data than the sensor data 114, such as one or more of location data, inertial data, LIDAR data, RADAR data, image data, audio data, environmental data, and/or depth data.

The primary system 106 may control the vehicle during normal operation. In many examples, the primary system 106 may be the main computing system on the autonomous vehicle 102. The primary system 106 may implement the AI techniques 112 to understand an environment around the autonomous vehicle 102 and/or instruct the autonomous vehicle 102 to move within the environment. The AI techniques 112 may include machine learning (also referred to, generally, as machine learned models), such as one or more neural networks. For example, the primary system 106 may analyze the sensor data 114 to localize the autonomous vehicle 102, detect an object around the autonomous vehicle 102, segment the sensor data 114, determine a classification of the object, predict an object track, generate the primary trajectory 116 and/or the secondary trajectory 118 for the autonomous vehicle 102, and so on. In the example of FIG. 1, the primary system 106 generates the primary trajectory 116 to control the autonomous vehicle 102 and generates the secondary trajectory 118 as a contingent (e.g., backup) trajectory to be used instead of the primary trajectory in the event that the primary trajectory 116 is invalid or otherwise unacceptable, or otherwise to be executed in the case of hardware or software failures, or the like. In examples, the secondary trajectory 118 may control the autonomous vehicle 102 to decelerate to a stop (e.g., a gentle stop associated with a deceleration rate that is less than a maximum deceleration rate that is possible for the autonomous vehicle 102).

In examples, a trajectory comprises a control(s) for a steering angle and/or acceleration of the autonomous vehicle 102. Further, a trajectory may comprise a sequence of times and vehicle states (e.g., poses) which represent an estimated future path of the autonomous vehicle 102. For example, a trajectory may control a path that the autonomous vehicle 102 will take over a window of time (e.g., one millisecond, half a second, two seconds, ten seconds, etc.). A trajectory may be continuously updated over time to control motion of the autonomous vehicle 102.

The secondary system 108 may evaluate the primary system 106 and take over control of the autonomous vehicle 102 when there is a problem with the primary system 106. The secondary system 108 may implement secondary techniques (e.g., probabilistic techniques, techniques that are different than the AI techniques 112, etc.) that are based on positioning, velocity, acceleration, etc. of the autonomous vehicle 102 and/or objects around the autonomous vehicle 102. For example, the secondary system 108 may implement a Kalman filter, an extended Kalman filter (EKG), a particle filter, and/or tracking algorithms to process sensor data, segment sensor data, identify a classification of an object, predict an object trajectory, and so on. In examples, the secondary system 108 may not perform any form of AI techniques. In some examples, the AI techniques 112 may use neural networks, while the secondary system 108 may refrain from using such neural networks. In other examples, the secondary system 108 may perform AI techniques, such as implementing a machine learned model that is different (or the same in some instances) than a machine learned model implemented by the primary system 106. Although a single secondary system 108 is illustrated, in examples the secondary system 108 may be implemented as multiple systems, such as multiple hardware/software systems.

In examples, to evaluate the primary system 106, the secondary system 108 may process the sensor data 120 to determine a position and/or orientation (together a pose) of the autonomous vehicle 102 relative to a point and/or object in an environment. Further, the secondary system 108 may process the sensor data 120 to detect objects around the autonomous vehicle 102, track the objects over time, and/or predict trajectories for the objects. In some examples, the secondary system 108 may receive information from the primary system 106 indicating tracks of objects that are detected by the primary system 106 and/or predicted trajectories of the objects. A track of an object may include a path traveled by the object. A track of an object may represent (or be based on) a current or previous position, velocity, acceleration, orientation, and/or heading of the object over a period of time (e.g., 5 seconds). The secondary system 108 may maintain a track and/or predicted trajectory for each object detected around the autonomous vehicle 102. In the example of FIG. 1, the secondary system 108 estimates a trajectory 124 for an object 126. Here, the object 126 represents a person, although the object 126 may represent any type of object, such as another vehicle, a structure (e.g., building, etc.), an animal, a sign, and so on.

The secondary system 108 may use the pose, track, and/or predicted trajectory to evaluate the primary trajectory 116 and/or the secondary trajectory 118. As illustrated, the secondary system 108 may include a trajectory management component 128 to perform one or more validation operations to validate the primary trajectory 116, the secondary trajectory 118, and/or a trajectory that is generated by the secondary system 108, such as a collision avoidance trajectory (e.g., a trajectory that causes the autonomous vehicle 102 to decelerate to a stop, which may be a modified version of either the primary trajectory 116 or the secondary trajectory 118). In examples, the trajectory management component 128 may validate one or more of the primary trajectory 116, the secondary trajectory 118, and/or the trajectory that is generated by the secondary system 108 in parallel (e.g., the collision avoidance trajectory). Although any of such trajectories may be validated in series or another manner.

In examples, the trajectory management component 128 may perform the one or more validation operations to determine if a trajectory is relatively new, consistent with a state of the autonomous vehicle 102, and/or feasible with limitations of the autonomous vehicle 102. For example, the trajectory management component 128 may determine if a trajectory was generated less than a threshold amount of time ago (e.g., indicating that the trajectory is relatively new and should be used), if the trajectory is consistent with a current or previous pose of the vehicle (e.g., the trajectory controls the autonomous vehicle 102 to be positioned at a location that is possible given the current pose of the autonomous vehicle 102), if the trajectory is compatible with a capability of the autonomous vehicle 102 (e.g., steering limits, acceleration limits, etc.), and so on.

Further, in examples, the trajectory management component 128 may perform the one or more validation operations to determine if a trajectory is associated with a collision, such as a collision 130 illustrated in FIG. 1. For example, the trajectory management component 128 may determine if a trajectory provided by the primary system 106 intersects with a trajectory of an object determined by the secondary system 108. That is, the trajectory management component 128 may determine if the autonomous vehicle 102 would collide with an object if the autonomous vehicle 102 continues along the trajectory (e.g., detect a collision that was potentially missed by the primary system 106). In examples, the trajectory management component 128 may use a straight-line approximation to predict a trajectory of an object.

Based on the one or more validation operations, the trajectory management component 128 may determine a state for a trajectory. For example, the trajectory management component 128 may determine a valid state for a trajectory if the trajectory was generated less than a threshold amount of time ago, if the trajectory is consistent with a current or previous pose of the autonomous vehicle 102, if the trajectory is compatible with a capability of the autonomous vehicle 102, and/or if the trajectory is collision free or associated with a collision in more than a threshold amount of time. Further, the trajectory management component 128 may determine an invalid state for a trajectory if the trajectory was generated more than a threshold amount of time ago, if the trajectory is inconsistent with a current or previous pose of the autonomous vehicle 102, if the trajectory is incompatible with a capability of the autonomous vehicle 102, and/or if the trajectory is associated with a collision.

The trajectory management component 128 may then determine the output trajectory 122 to provide to the system controller(s) 110 based on states of trajectories. For example, the trajectory management component 128 may generally seek to select, as the output trajectory 122, the primary trajectory 116 when the primary trajectory 116 is valid (e.g., the primary trajectory 116 is associated with a highest level). If the primary trajectory 116 is invalid, the trajectory management component 128 may select, as the output trajectory 122, the secondary trajectory 118 (e.g., the secondary trajectory 118 is associated with a next highest level). If the primary trajectory 116 and the secondary trajectory 118 are both invalid, the trajectory management component 128 may select, as the output trajectory 122, a trajectory that is generated by the secondary system 108, such as a collision avoidance trajectory that causes the autonomous vehicle 102 to come to a stop along a modified version of the primary trajectory 116 or the secondary trajectory 118 (e.g., to avoid a potential collision). For example, the trajectory management component 128 may use steering controls associated the primary trajectory 116 or the secondary trajectory 118 while modifying acceleration parameters associated with the primary trajectory 116 or the secondary trajectory 118 to cause the autonomous vehicle 102 to stop.

In some examples, if the trajectory management component 128 is unable to select or generate a trajectory that avoids a collision, the trajectory management component 128 (or another component, such as a drive manager component) may generate a maximum deceleration trajectory that causes the autonomous vehicle 102 to come to a stop at a maximum deceleration rate that is available for the autonomous vehicle 102 (e.g., from among multiple deceleration rates that are available). This may help mitigate damage for a potential collision.

In examples, the trajectory management component 128 may maintain control of the autonomous vehicle 102 based on the output trajectory 122 until a signal is received to release control from the output trajectory 122. For example, the trajectory management component 128 may transition to a lower level trajectory at any time, if needed, and refrain from transitioning back to a higher level trajectory until a signal is received to release control to a higher level trajectory. To illustrate, if the trajectory management component 128 selects the secondary trajectory 118 due to the primary trajectory 116 being invalid, control of the autonomous vehicle 102 may be maintained along the secondary trajectory 118 (or an even lower level trajectory) until a signal is received from a teleoperations system (e.g., system associated with an operator) to release control to a higher level trajectory. By doing so, the autonomous vehicle 102 may avoid frequent changes between trajectories.

Further, in examples, the trajectory management component 128 may provide a message to the primary system 106 indicating an error with a trajectory provided by the primary system. For example, if the trajectory management component 128 determines that a collision is estimated to occur for the primary trajectory 116 far enough in the future that the autonomous vehicle 102 does not need to brake immediately (e.g., more than a threshold amount of time away), the trajectory management component 128 may send a message 132 to the primary system 106 to warn the primary system 106. The message 132 may indicate that the primary trajectory 116 is associated with a collision and/or that control of the autonomous vehicle 102 will be taken over by the secondary system 108 if the autonomous vehicle 102 is maintained based on the primary trajectory 116. This may allow the primary system 106 to adjust the primary trajectory 116 before the collision occurs.

The system controller(s) 110 may control steering, propulsion, braking, safety, emitters, communication, and/or other systems of the autonomous vehicle 102. The system controller(s) 110 may communicate with and/or control corresponding systems of a drive system(s) and/or other components of the autonomous vehicle 102. In some instances, the system controller(s) 110 may translate a trajectory selected into instructions useable by a drive system(s) to cause the autonomous vehicle 102 to traverse the trajectory.

Figure 2:
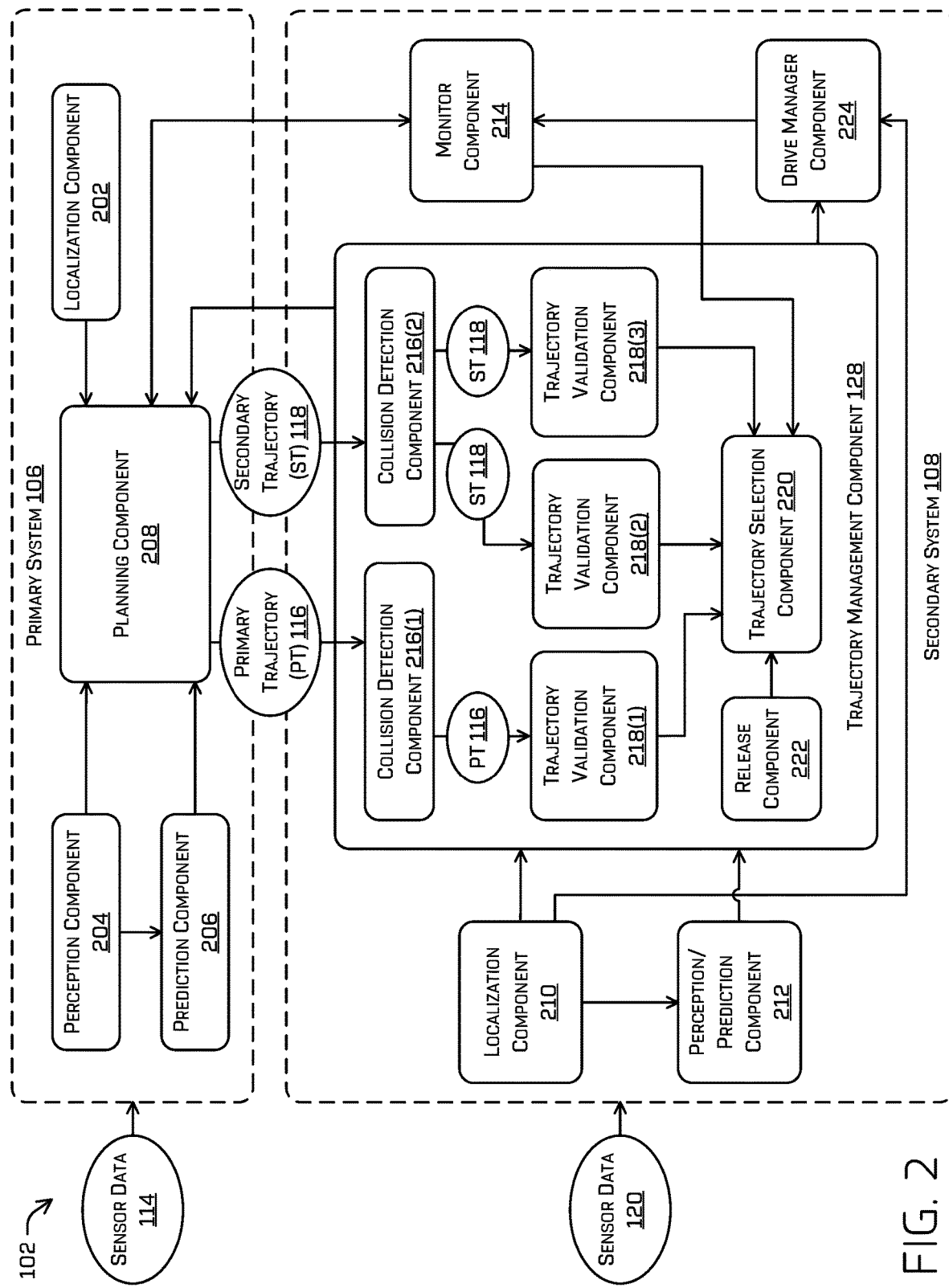
FIG. 2 depicts example details of a primary system and a secondary system of a vehicle.

FIG. 2 depicts example details of the primary system 106 and the secondary system 108 of the autonomous vehicle 102 of FIG. 1.

In this example, the primary system 106 includes a localization component 202, a perception component 204, a prediction component 206, and a planning component 208. The localization component 202, the perception component 204, the prediction component 206, and/or the planning component 208 may collectively and/or individually include a processing pipeline that implements one or more machine learned models, such as neural networks, that accomplish a variety of functions. Each processing pipeline may receive data and provide an output. In one example, the perception component 204 implements one or more neural networks in a processing pipeline to perform object detection, segmentation, and/or classification, in addition to (or alternative to) determining predicted motion of the such detected objects. Each stage in the pipeline may provide some aspect of perception (e.g., object detection, classification, bounding box generation, and the like) that may feed into another stage of the pipeline. In examples, the primary system 106 implements multiple neural networks that are trained using thousands or hundreds of thousands of hours of vehicle training data. Further, the multiple neural networks may be configured to perceive a myriad of complex scenarios and control the autonomous vehicle 102 in view of those scenarios. In examples, the primary system 106 uses parallel computing (e.g., in a GPU), while the secondary system 108 does not. In other examples, parallel computing is used in the primary system 106 and/or the secondary system 108.

As described herein, an exemplary neural network is a biologically inspired algorithm which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

The localization component 202 may include functionality to receive the sensor data 114 from one or more of the sensor(s) 104 (not illustrated in FIG. 2) to determine a pose (e.g., position and/or orientation) of the autonomous vehicle 102 and/or a map of an environment surrounding the autonomous vehicle 102. For example, the localization component 202 may determine and/or receive a map of an environment and may continuously determine a location of the autonomous vehicle 102 within the map. The map may comprise a topological map, an occupancy grid, a point map, a landmark map, a mesh, a graph of pose constraints, and/or any other suitable map. In some instances, the localization component 202 may utilize SLAM (simultaneous localization and mapping) or CLAMS (calibration, localization and mapping, simultaneously) to receive image data, LIDAR data, RADAR data, IMU data, GPS data, wheel encoder data, and/or the like to accurately determine a location/pose of the autonomous vehicle 102. The location of the autonomous vehicle 102 may comprise a pose that includes a relative position and/or orientation of the autonomous vehicle 102 in relation to point(s) and/or object(s) in the map, a local coordinate, and/or a global coordinate (e.g., a GPS coordinate). In additional or alternate instances, the orientation may include an indication of a yaw, roll, and/or pitch of the autonomous vehicle 102 relative to a reference plane and/or relative to point(s) and/or object(s) in the map. Together the position and/or orientation may describe a "pose."

In some instances, the localization component 202 may provide data to various components of the autonomous vehicle 102. For example, the localization component 202 may provide a pose of the autonomous vehicle 102 to the planning component 208 to generate a trajectory, as discussed below. In other examples, the localization component 202 may provide a pose of the autonomous vehicle 102 to other components of the autonomous vehicle 102, such as the perception component 204 and/or the prediction component 206.

The perception component 204 may include functionality to perform object detection, segmentation, and/or classification. In some examples, the perception component 204 may receive as input the sensor data 114 and output primary perception data that indicates a presence of an object that is proximate to the autonomous vehicle 102 and/or a classification of the object as an object type (e.g., a semantic label such as, for example, car, pedestrian, cyclist, building, tree, road surface, curb, sidewalk, unknown, etc.). Additionally, or alternatively, the perception component 204 may provide processed sensor data that indicates one or more characteristics associated with a detected object and/or the environment in which the object is positioned. In some examples, characteristics associated with an object may include, but are not limited to, an x-position (e.g., global position, relative position, etc.), a y-position (e.g., global position, relative position, etc.), a z-position (e.g., global position, relative position, etc.), an orientation, an object type (e.g., a classification), a velocity of the object, an extent of the object (size), etc. In some examples, a velocity of an object may be determined from RADAR processing and/or other techniques. Characteristics associated with the environment may include, but are not limited to, a presence of another object in the environment, a state of another object in the environment, a time of day, a day of a week, a season, a weather condition, an indication of darkness/light, etc.

In some instances, the perception component 204 may provide primary perception data and/or processed sensor data to various components of the autonomous vehicle 102. For example, the perception component 204 may provide primary perception data and/or processed sensor data to the planning component 208 and/or the prediction component 206. In other examples, the perception component 204 may provide primary perception data and/or processed sensor data to other components of the autonomous vehicle 102, such as the localization component 202. In examples, primary perception data and/or processed sensor data may be in the form of a primary object list including a list of objects and/or characteristics for each of the objects.

The prediction component 206 may associate a track with a detected object and/or predict an object trajectory. A track of an object may comprise historical object position, velocity, acceleration, and/or orientation. In some instances, the prediction component 206 may determine whether or not to associate a historical object track with an object recently detected by the perception component 204. For example, the prediction component 206 may determine whether a recently detected object is within a threshold distance of a previous position of the object associated with the historical track, a threshold velocity of a previous velocity of the object associated with the historical track, etc. In some examples, the prediction component 206 may include machine learned models to predict a behavior of an object in the environment based on lighting state (e.g., blinker detection), object velocity/acceleration, map data (e.g., lane information indicating reasonable driving behaviors), and/or learned object behaviors. In some examples, the prediction component 206 may predict one or more predicted object trajectories for a specific object detected by the perception component 204 based on, for example, probabilistic determinations or multimodal distributions of a historical, current, and/or or predicted position, velocity, acceleration, and/or orientation of an object.

In some instances, the prediction component 206 may provide data regarding an object track, predicted object trajectories (e.g., one or more trajectories and associated uncertainties), and/or other data to various components of the autonomous vehicle 102. For example, the prediction component 206 may provide such data to the planning component 208. In some examples, the prediction component 206 may generate a heat map associated with predicted motion of an object and may provide such a heat map to the planning component 208. In other examples, the prediction component 206 may provide data regarding an object to other components of the autonomous vehicle 102, such as the localization component 202 and/or the perception component 204. Further, in some examples, data regarding an object may be provided to the secondary system 108. In examples, data regarding an object may be stored in a primary object list.

In some examples, the perception component 204 and/or the prediction component 206 may implement techniques discussed in U.S. patent application Ser. No. 15/622,905 entitled "Voxel Based Ground Plane Estimation and Object Segmentation" and filed Jun. 14, 2017, U.S. patent application Ser. No. 15/833,715 entitled "Trajectory Prediction of Third-Party Objects Using Temporal Logic and Tree Search" and filed Dec. 6, 2017, and/or U.S. patent application Ser. No. 15/820,245, entitled "Sensor Data Segmentation" and filed Nov. 21, 2017, the entire contents of all of which are incorporated herein by reference.

The planning component 208 may determine a path and/or trajectory for the autonomous vehicle 102 to follow to traverse through an environment. For example, the planning component 208 may determine various routes and/or trajectories and various levels of detail. For example, the planning component 208 may determine a route to travel from a first location (e.g., a current location) to a second location (e.g., a target location). In examples, a route may be a sequence of waypoints for travelling between two locations. As non-limiting examples, waypoints include streets, intersections, global positioning system (GPS) coordinates, etc. Further, the planning component 208 may generate an instruction for guiding the autonomous vehicle 102 along at least a portion of the route from the first location to the second location. In at least one example, the planning component 208 may determine how to guide the autonomous vehicle 102 from a first waypoint in the sequence of waypoints to a second waypoint in the sequence of waypoints. In some examples, the instruction may comprise a trajectory, or a portion of a trajectory.

In examples, the planning component 208 may generate the primary trajectory 116 and/or send the primary trajectory 116 to the secondary system 108. For example, the planning component 208 may substantially simultaneously (e.g., within technical tolerances) generate multiple trajectories in accordance with a receding horizon technique and/or based at least in part on data received from the other components of the primary system 106. In some instances, the planning component 208 may conduct a cost-based search (or any other suitable algorithm for identifying a suitable trajectory for controlling motion of the autonomous vehicle 102) over the multiple trajectories to identify the primary trajectory 116 to transmit to the secondary system 108.

In examples, the planning component 208 may generate the secondary trajectory 118 and/or send the secondary trajectory 118 to the secondary system 108. For example, the planning component 208 may generate multiple contingent trajectories and select one of the contingent trajectories to be the secondary trajectory 118. The secondary trajectory 118 may represent a backup trajectory that is used in the event that the primary trajectory 116 is invalid or otherwise unacceptable. The secondary trajectory 118 may differ from the primary trajectory 116. In one example, the primary trajectory 116 may cause the autonomous vehicle 102 to accelerate or maintain a particular velocity, while the secondary trajectory 118 may cause the autonomous vehicle 102 to decelerate to a stop, such as a gentle stop (as discussed below). In another example, the primary trajectory 116 may cause the autonomous vehicle 102 to make a lane change, whereas the secondary trajectory 118 may cause the autonomous vehicle 102 to stay in a same lane. In yet another example, the primary trajectory 116 may cause the autonomous vehicle 102 to maintain a current speed and steering angle, whereas the secondary trajectory 118 may cause the autonomous vehicle 102 to pull over onto a roadway shoulder.

In examples, a gentle stop may include braking at a particular rate, such as a predetermined rate, a rate that is less than a first rate (e.g., maximum braking rate), a rate that is greater than a second rate (e.g., minimum braking rate), a rate from among a plurality of available rates that is substantially in the middle (e.g., a third rate from among five rates), a minimum rate from among a plurality of rates, and so on. A rate of deceleration may refer to a unit of measurement over time, such as a number of meters or feet per second squared (m/s^2). In one example, a gentle stop may include decelerating at a rate of 5 or 10 feet per second squared until the autonomous vehicle 102 comes to a stop.

Although the localization component 202, the perception component 204, and the prediction component 206 are discussed in many examples as providing outputs to each other (or other components of the primary system 106), any of these components may provide output to the secondary system 108, in some examples.

As illustrated, the secondary system 108 includes a localization component 210, a perception/prediction component 212, the trajectory management component 128, and a monitor component 214. In examples, the localization component 210, the perception/prediction component 212, the trajectory management component 128, and/or the monitor component 214 may implement a model that is based on physics and/or statistics (e.g., positioning, velocity, acceleration, etc. of the autonomous vehicle 102 and/or objects around the vehicle). In some examples, such models may incorporate probabilistic models. For example, the secondary system 108 may implement a Kalman filter (also referred to as linear quadratic estimation (LQE)) (e.g., an extended Kalman filter (EKF), an unscented Kalman filter (UKF), etc.), a particle filter, a Bayesian filter, and so on. To illustrate, the perception/prediction component 212 may implement a Kalman filter or particle filter. In some examples, the secondary system 108, in contrast to the primary system 106, may be configured in such a way to exclude the use of machine learned models or to reduce the number of machine learned models. In other examples, the secondary system 108 may include one or more machine learned models different than (or similar or identical) those of the primary system 106. In some examples, the secondary system 108 may use different hardware (e.g., processors and memory) than the primary system 106.

In examples, the secondary system 108 may be designed to be less computationally burdensome and/or operate at a higher integrity level. For example, a processing pipeline of the secondary system 108 may be simpler by relying on less sensor data, include less complex pipeline components, include less pipeline components overall, output less data, and/or exclude and/or limit the use of machine learned models. In some instances, the secondary system 108 may be a "high-integrity" system by achieving stringent operating tolerances and/or have the ability to be inspected (verified). In examples, the secondary system 108 may have a higher level of reliability and/or verifiability than the primary system 106. For example, output of a sub-component of the secondary system 108 may be certified to operate with complete accuracy or near-complete accuracy (e.g., 99.99% of scenarios, or higher). In some examples, the secondary system 108 may comprise an Automotive Safety Integrity Level (ASIL) D certification.

The localization component 210 may process the sensor data 120 from the sensor(s) 104 to determine one or more of a position and/or orientation (together a pose) of the autonomous vehicle 102. Here, the position and/or orientation may be relative to point(s) and/or object(s) in an environment in which the autonomous vehicle 102 is located. In examples, the orientation may include an indication of a yaw, roll, and/or pitch of the autonomous vehicle 102 relative to a reference plane and/or relative to point(s) and/or object(s).

In examples, the localization component 210 may perform less processing than the localization component 202 of the primary system 106 (e.g., higher-level localization). For instance, the localization component 210 may not determine a pose of the autonomous vehicle 102 relative to a map, but merely determine a pose of the autonomous vehicle 102 relative to objects and/or surfaces that are detected around the autonomous vehicle 102 (e.g., a local position and not a global position) and/or to a previous pose of the autonomous vehicle 102. Such a position and/or orientation may be determined, for example, using probabilistic filtering techniques, such as, for example, Bayesian filters (Kalman filters, extended Kalman filters, unscented Kalman filters, etc.) using some or all of the sensor data 120.

The localization component 210 may provide the position and/or orientation of the autonomous vehicle 102 to various components of the secondary system 108, such as the perception/prediction component 212, the trajectory management component 128, etc.

The perception/prediction component 212 may include functionality to perform object detection, object segmentation, object classification, track determination, and/or predicting one or more trajectories for each object (including uncertainties, for example), etc. In some examples, the perception/prediction component 212 may receive, as input data, the sensor data 120 from one or more of the sensor(s) 104, a pose of the autonomous vehicle 102 from the localization component 210, data indicating a direction of motion of the autonomous vehicle 102, data indicating a velocity of the autonomous vehicle 102, data indicating an acceleration of the autonomous vehicle 102, data indicating a yaw rate of the autonomous vehicle 102, data indicating a yaw acceleration, and/or data indicating a steering angle of the autonomous vehicle 102. Further, in some examples, the perception/prediction component 212 may receive, as input data, data from the primary system 106, such as a primary object list from the perception component 204, a pose of the autonomous vehicle 102, one or more object tracks as determined by the primary system 106, etc. As noted above, the object list from the primary system 106 may include primary perception data, processed sensor data, data regarding a track/trajectory of an object, etc. In such an example, the perception/prediction component 212 may perform data association (e.g., by using probabilistic filters, clustering, nearest point analysis, or the like) to associate sensor data with a track.

The perception/prediction component 212 may process the input data to determine secondary perception data. The secondary perception data may indicate a presence of an object that is proximate to the autonomous vehicle 102, a characteristic(s) associated with the object, and so on. Here, a characteristic(s) associated with an object may include a position of the object relative to the autonomous vehicle 102, an orientation of the object relative to the autonomous vehicle 102, a velocity of the object, an acceleration of the object, an extent of the object (a size of the object), etc. In many examples, a characteristic included in the secondary perception data does not include a classification of an object (e.g., semantic label). Although in some examples, the secondary perception data may indicate a classification.

The perception/prediction component 212 may also process the input data to determine one or more tracks for an object. As noted above, a track of an object may comprise historical position, velocity, acceleration, and/or orientation, and the like. In one example, the perception/prediction component 212 may determine an object in an environment at a first time, determine an object in an environment at a second time, determine an overlap of the objects at the first time and second time, and generate a track for the object. In another example, the perception/prediction component 212 may determine a velocity of an object at a first time, compare a predicted motion of the object with captured data of the object at a second time, determine an overlap, and generate a track for the object. The perception/prediction component 212 may determine a track for each object detected around the autonomous vehicle 102. In some examples, the perception/prediction component 212 may determine a track of an object independently from data received from the primary system 106 (e.g., will not use a primary object list and/or a pose of the autonomous vehicle 102 received from the primary system 106). While in other examples, the perception/prediction component 212 may use data received from the primary system 106.

The perception/prediction component 212 may also process the input data to determine one or more predicted trajectories for an object. For example, based on a current position of an object and a velocity of the object over a period of a few seconds, the perception/prediction component 212 may predict a path that the object will move over the next few seconds. In some examples, such a predicted path may comprise using linear assumptions of motion given a position, orientation, velocity, and/or orientation, such as using a straight-line approximation. In other examples, such predicted paths may comprise more complex analyses, such as using an extended Kalman filter (EKF) propagation, models of object behavior, or other prediction techniques.

The perception/prediction component 212 may output the secondary perception data and/or data regarding an object (e.g., a track, trajectory, etc.) to the trajectory management component 128 and/or any other component of the secondary system 108. In examples, the secondary perception data and/or data of an object are represented in a secondary object list. For instance, the object list may indicate, for each object, a characteristic(s) of the object and/or a track/trajectory of the object. In examples, the perception/prediction component 212 may output the secondary perception data and/or data regarding an object to the primary system 106.

For ease of illustration the perception/prediction component 212 (and other components of the primary system 106 and the secondary system 108) is illustrated with a single block. However, the perception/prediction component 212 (and/or other components of the primary system 106 and the secondary system 108) may be implemented as any number of blocks, each block located in one or more system or subsystem.

The trajectory management component 128 may evaluate the primary system 106 and take over control of the autonomous vehicle 102 if a problem is detected. For example, the trajectory management component 128 may evaluate the primary trajectory 116 and/or the secondary trajectory 118 to determine if the primary trajectory 116 and/or the secondary trajectory 118 should be used, or another trajectory should be used. As illustrated, the trajectory management component 128 may include collision detection components 216(1)-(2), trajectory validation components 218(1)-(3), a trajectory selection component 220, and a release component 222.

The collision detection component detection components 216 may evaluate the primary trajectory 116 and the secondary trajectory 118 to detect a potential collision. For example, the collision detection component 216(1) may determine if the primary trajectory 116 intersects with a predicted trajectory of an object (e.g., determined by the perception/prediction component 212) and if the object and the autonomous vehicle 102 would meet at the intersection at the same time (or a window of time). These determinations may be repeated for any number of objects detected. Further, such determinations may additionally or alternatively include information regarding uncertainties of one or more of the trajectory of the autonomous vehicle 102 as well as those of the objects. The collision detection component 216(2) may determine if the secondary trajectory 118 intersects with a predicted trajectory of an object(s) (e.g., determined by the perception/prediction component 212) (and/or meets or exceeds a threshold certainty of collision) and if the object and the autonomous vehicle 102 would meet at the intersection at the same time (or a window of time).

The collision detection components 216 may detect if a trajectory for the autonomous vehicle 102 intersects at a present time or a future time for any number of objects detected by the autonomous vehicle 102. In some instances, this may include determining if a predicted object trajectory and a vehicle trajectory intersect and/or come within a threshold distance of each other (e.g., a location of proximity), determining if an object along the predicted object trajectory and the autonomous vehicle 102 along the vehicle trajectory would meet at any intersection or location of proximity at the same time or a window of time, and/or determining if a bounding box for the object overlaps with a bounding box for the autonomous vehicle 102 around any intersection or location of proximity. Further, in examples, the same process may be performed with a safety margin around each bounding box (e.g., a safety bounding box that represents a bounding box that has been enlarged by a particular amount, such as by adjusting a length/width/height of a bounding box). A bounding box may represent a spatial location, orientation, and/or size (e.g., extents) of an object. For example, a bounding box may be a representation of an object defined by eight corners (e.g., a cuboid) and having a position, orientation, length, width, and/or height. In examples, a bounding box may be a minimum volume cuboid which encompasses an object.

The collision detection components 216 may provide data to the trajectory validation components 218 indicating a detection(s) of a collision. Further, as illustrated, the collision detection component 216(1) may pass the primary trajectory 116 (shown as "PT 116") to the trajectory validation component 218(1). The collision detection component 216(2) may pass the secondary trajectory 118 (shown as "ST 118") to the trajectory validation component 218(2) and the trajectory validation component 218(3).

Although two collision detection components 216 are illustrated in FIG. 2, any number of collision detection components 216 may be implemented, such as a single collision detection component 216, more than two collision detection components 216 (e.g., for further primary/secondary trajectories), and so on.

In examples, the trajectory validation components 218 may perform one or more validation operations to determine if a trajectory is valid. In some examples, the trajectory validation component 218(1) may determine if the primary trajectory 116 is valid by performing one or more validation operations discussed below in reference to FIG. 3. Further, in some examples, the trajectory validation component 218(2) may determine if the secondary trajectory 118 is valid by performing one or more validation operations discussed below in reference to FIG. 4.

Moreover, in some examples, the trajectory validation component 218(3) may determine if the secondary trajectory 118 is valid. If the secondary trajectory 118 is invalid, the trajectory validation component 218(3) may generate another trajectory and determine if the other trajectory is valid. The trajectory generated by the trajectory validation component 218(3) may include a collision avoidance trajectory that causes the autonomous vehicle 102 to decelerate to a stop in an attempt to avoid or mitigate a potential collision. For example, the collision avoidance trajectory may include a deceleration along the secondary trajectory 118 (or the primary trajectory 116, in some cases). In some examples, the collision avoidance trajectory may comprise a perturbation of the secondary trajectory 118 in order to mitigate any potential collisions detected in the secondary trajectory 118. The trajectory validation component 218(3) may generate the collision avoidance trajectory based on information about the pose of the autonomous vehicle 102 (e.g., provided by the localization component 210), information about an object(s) (e.g., track or trajectory information provided by the perception/prediction component 212), information provided by the primary system 106, and/or any other information available to the secondary system 108. In some examples, the trajectory validation component 218(3) may perform one or more of the validation operations discussed below in reference to FIG. 5.

The trajectory validation components 218 may output data to the trajectory selection component 220 indicating a validity of a trajectory. For example, the trajectory validation component 218(1) may determine a state of the primary trajectory 116 indicating if the primary trajectory 116 is valid or invalid and output the state to the trajectory selection component 220. Further, the trajectory validation component 218(2) may determine a state of the secondary trajectory 118 indicating if the secondary trajectory 118 is valid or invalid and output the state to the trajectory selection component 220. Moreover, the trajectory validation component 218(3) may determine a state of a collision avoidance trajectory (e.g., a modified secondary trajectory 118 or the secondary trajectory 118) and output the state to the trajectory selection component 220.

Although three trajectory validation components 218 are illustrated in FIG. 2, any number of trajectory validation components 218 may be implemented, such as a single trajectory validation component 218, more than three trajectory validation components 218 (e.g., for further trajectories), and so on.

In examples, the trajectory management component 128 may provide a message to the planning component 208 (or another component of the primary system 106) indicating a state of a trajectory (e.g., valid or invalid). For example, one or more of the trajectory validation components 218 may send a message to the planning component 208 indicating if a trajectory is valid or invalid. In examples, the message may indicate one or more of a time to collision, extents of an object associated with a potential collision, a velocity of the object, a location of the object, or a point of collision (e.g., location of the detected collision).

The trajectory selection component 220 may determine an output trajectory to send to the system controller(s) 110. The trajectory selection component 220 may generally select the primary trajectory 116, the secondary trajectory 118, a collision avoidance trajectory (or another trajectory generated by the secondary system 108), and/or a maximum deceleration trajectory. Such selection may be based on one or more states for one or more trajectories provided by the trajectory validation components 218. The primary trajectory 116 may have a higher level than the secondary trajectory 118, the secondary trajectory 118 may have a higher level than the collision avoidance trajectory, and the collision avoidance trajectory may have a higher level than the maximum deceleration trajectory. In many examples, a trajectory of a lower level may be associated with a higher deceleration rate than a trajectory of a higher level. For example, the collision avoidance trajectory may be associated with a higher deceleration rate (e.g., more feet per second) than the secondary trajectory 118. The trajectory selection component 220 may generally select a highest level trajectory that is valid. This may allow the autonomous vehicle 102 to decelerate with the least amount of deceleration to avoid a collision and provide a relatively comfortable ride for passengers.

In examples, a maximum deceleration trajectory (also referred to as a hard stop or emergency stop) may include braking at a particular rate, such as a predetermined rate, a rate that is greater than a threshold (e.g., a maximum braking rate), a rate from among a plurality of available rates that is a greatest rate, and so on. In one example, a maximum deceleration trajectory may include decelerating at a rate of 15 or 20 feet per second per second until the autonomous vehicle 102 comes to a stop.

In examples, the trajectory selection component 220 may select, as the output trajectory, the primary trajectory 116 when the primary trajectory 116 is valid. If the primary trajectory 116 is invalid, the trajectory selection component 220 may select, as the output trajectory, the secondary trajectory 118. If the primary trajectory 116 and the secondary trajectory 118 are both invalid, the trajectory selection component 220 may select, as the output trajectory, the collision avoidance trajectory. If the primary trajectory 116, the secondary trajectory 118, and the collision avoidance trajectory are all invalid, the trajectory selection component 220 may select the maximum deceleration trajectory. Once the trajectory selection component 220 selects a trajectory, the trajectory selection component 220 may send a signal to a drive manager component 224 (or the system controller(s) 110 of FIG. 1) indicating the trajectory to use to control the autonomous vehicle 102.

In examples, if the output trajectory is associated with a deceleration, the trajectory selection component 220 may send a signal to another component of the autonomous vehicle 102 to prepare for such deceleration. For example, if the maximum deceleration trajectory is selected due to a likely collision, the trajectory selection component 220 may output a signal to warn other components, so that the other components may prepare for a collision (e.g., pre-tensioning seat belts, preparing air bags for deployment, etc.).

In examples, the trajectory selection component 220 maintains data indicating a selected trajectory (e.g., the output trajectory). For example, the trajectory selection component 220 may maintain a state machine that transitions between states associated with trajectories, respectively. Example states that may be implemented by the trajectory selection component 220 are discussed below in reference to FIG. 6. In examples, the trajectory selection component 220 may transition to a lower level state and may not transition to a higher level state until a signal is received to release control from the lower level state.

The release component 222 may send a signal to the trajectory selection component 220 to release control from a current state (e.g., release control from a trajectory). In one example, a remote system may provide a signal to the secondary system 108 to release control from a current state, and in response, the release component 222 may send a signal to the trajectory selection component 220 to release control from the current state. The remote system may comprise an automated system, a teleoperations system associated with an operator (e.g., user), and/or another entity. The operator may help manage the autonomous vehicle 102 when a problem arises, such as an interruption in travel of the autonomous vehicle 102 (e.g., an unexpected stop). In one illustration, upon transitioning to a state associated with a trajectory other than the primary trajectory 116, the operator may communicate with passengers in the autonomous vehicle 102, analyze data associated with the autonomous vehicle 102, etc. to determine if the autonomous vehicle 102 is clear to resume normal operation (or to transition to a different state). Here, the operator may cause a signal to be sent to the secondary system 108 to release control from the current state when the operator determines that the autonomous vehicle 102 is clear to resume normal operation (or to transition to a different state). In another example, a component of the autonomous vehicle 102 may perform processing to determine that the autonomous vehicle 102 is clear to resume normal operation (or to transition to a different state) and send a signal to the release component 222 to release control from a current state.

The monitor component 214 may monitor the primary system 106, the secondary system 108, and/or other components of the autonomous vehicle 102 to determine if there is an error. In many examples, the monitor component 214 may monitor the primary system 106 more globally than the trajectory management component 128 (e.g., monitor global vehicle state information instead of just trajectories). In examples, the monitor component 214 may determine that an error has occurred if there is a hardware and/or software failure for the primary system 106, the secondary system 108, and/or another component (e.g., a failure of the sensor(s) 104, an actuator, or any other component of the autonomous vehicle 102), if power to the primary system 106, the secondary system 108, and/or another component is disrupted, if a signal has not been received from the primary system 106, the secondary system 108, and/or another component for some time (e.g., longer than a period of time, indicating that the primary system 106 is experiencing a problem), etc. Such determinations may be based on a signal from the primary system 106, a signal from a component of the primary system 106/secondary system 108, a signal from the drive manager component 224 (or an actuator (brakes, steering, etc.), which may be in communication with the drive manager component 224), and/or a signal from a service provider (e.g., remote device) indicating a hardware or software failure (e.g., diagnostics information). Additionally, or alternatively, such determinations may be based on a signal from a battery of the autonomous vehicle 102 or other component associated with providing power indicating whether or not power is being provided to the primary system 106/secondary system 108 (or a component of the primary system 106/secondary system 108). As illustrated in FIG. 2, the monitor component 214 may receive a signal from the drive manager component 224. Such signal may indicate an error with the drive manager component 224 and/or components in communication with the drive manager component 224, such as actuators. Further, the monitor component 214 may communicate with the planning component 208 to receive a signal indicating an error with the planning component 208 and/or to send information about monitoring (e.g., a state of the autonomous vehicle 102 indicating an error has occurred).

If the monitor component 214 determines an error with the primary system 106, the monitor component 214 may send a signal to the trajectory management component 128 (the trajectory selection component 220, for example) indicating such error. If the autonomous vehicle 102 is not already being controlled by a trajectory associated with a deceleration (e.g., the secondary trajectory 118, a collision avoidance trajectory, or a maximum deceleration trajectory), the trajectory selection component 220 may select a trajectory associated with a deceleration and send a signal to the system controller(s) 110 to control the autonomous vehicle 102 (e.g., to come to a stop).

The drive manager component 224 may receive a trajectory (e.g., from the trajectory selection component 220) and/or generate commands/instructions to control the autonomous vehicle 102. For example, the drive manager component 224 may control steering, propulsion, braking, safety, emitters, communication, and/or other systems of the autonomous vehicle 102. In some instances, the drive manager component 224 may translate a trajectory selected into instructions useable by a drive system(s) to cause the autonomous vehicle 102 to traverse the trajectory. In examples, the drive manager component 224 is implemented instead of or in cooperation the system controller(s) 110. Further, in examples, the drive manager component 224 may be replaced with the system controller(s) 110. In examples, the drive manager component 224 receives pose information from the localization component 210. Further, the drive manager component 224 may provide data to the monitor component 214, such as actuator diagnostics data indicating an error with an actuator.

In some examples, the secondary system 108 or another system performs ground removal techniques on the sensor data 120. This may occur before the sensor data 120 is used by components of the secondary system 108. For example, the secondary system 108 may analyze LIDAR data or voxel data associated with the LIDAR data to determine if the LIDAR data or voxels represents a ground. In some instances, the ground may correspond to a surface that is drivable by a vehicle. In some examples, the secondary system 108 may determine an inner product between a vector in a height dimension (e.g., a reference direction) of an apparatus carrying a LIDAR system, and a normal vector (such as may be determined based on an Eigenvalue decomposition per voxel), expressed in a common coordinate system. In such an example, the inner product meeting or exceeding a threshold of about 15 degrees, for example, may indicate that the voxel does not comprise the ground. Whereas the inner product being less than the threshold, may indicate that the voxel comprises the ground. Further, in some examples, the secondary system 108 may cluster voxels that are determined to be locally flat voxels to grow a surface corresponding to the ground. In examples, once a ground surface is identified in sensor data, data associated with the ground surface may be removed from the sensor data and the remaining data may be processed (e.g., object detection, segmentation, classification, etc.). In some examples, the primary system 106, the secondary system 108, and/or another system may perform ground removal techniques discussed in U.S. patent application Ser. No. 15/622,905 entitled "Voxel Based Ground Plane Estimation and Object Segmentation," and filed Jun. 14, 2017, the entire contents of which are incorporated herein by reference.

The components of the primary system 106 and/or the secondary system 108 may represent hardware and/or software components. In the context of software, one or more of the components may include instructions that are executable by one or more processors. In context of hardware, one or more of the components may be implemented as integrated circuits (e.g., application-specific integrated circuits (ASICs), etc.), gate arrays (e.g., field-programmable gate arrays (FPGAs), etc.), and so on. In at least some examples, both hardware and software of the primary system 106 and the secondary system 108 may differ.

Figure 3:
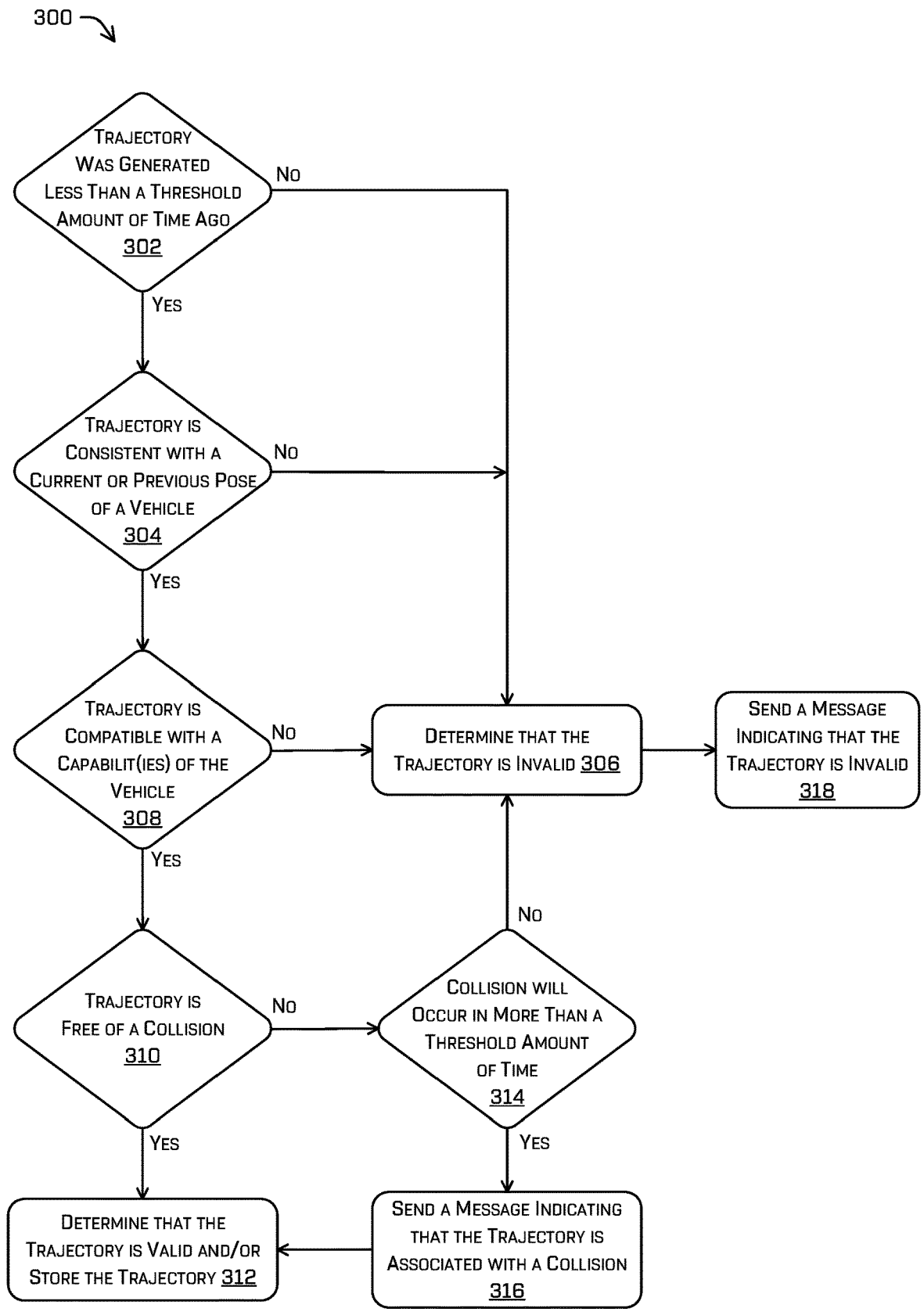
FIG. 3 illustrates an example process to determine if a trajectory for a vehicle is valid or invalid.
Figure 4:
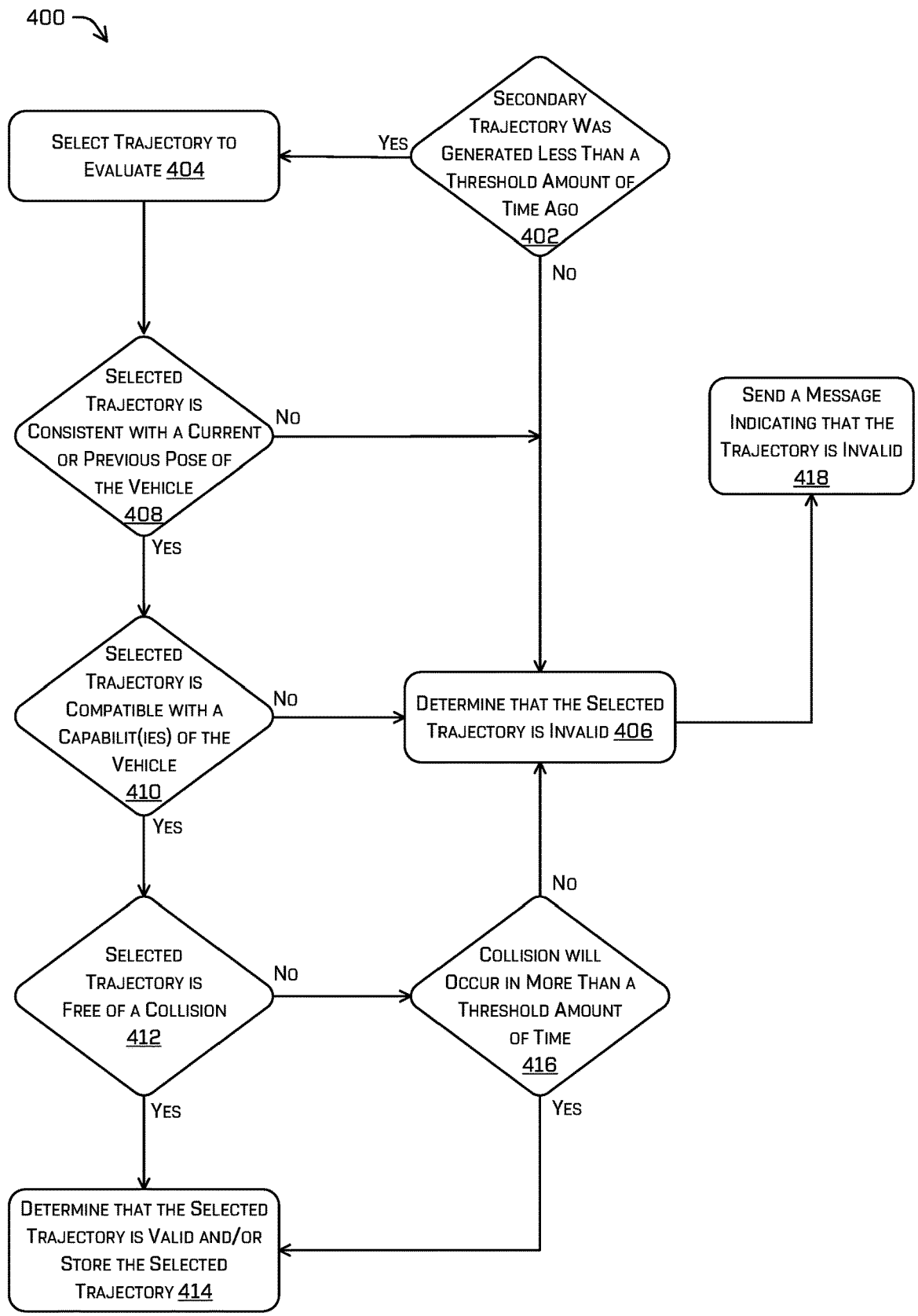
FIG. 4 illustrates an example process to determine if a trajectory for a vehicle is valid or invalid.
Figure 5:
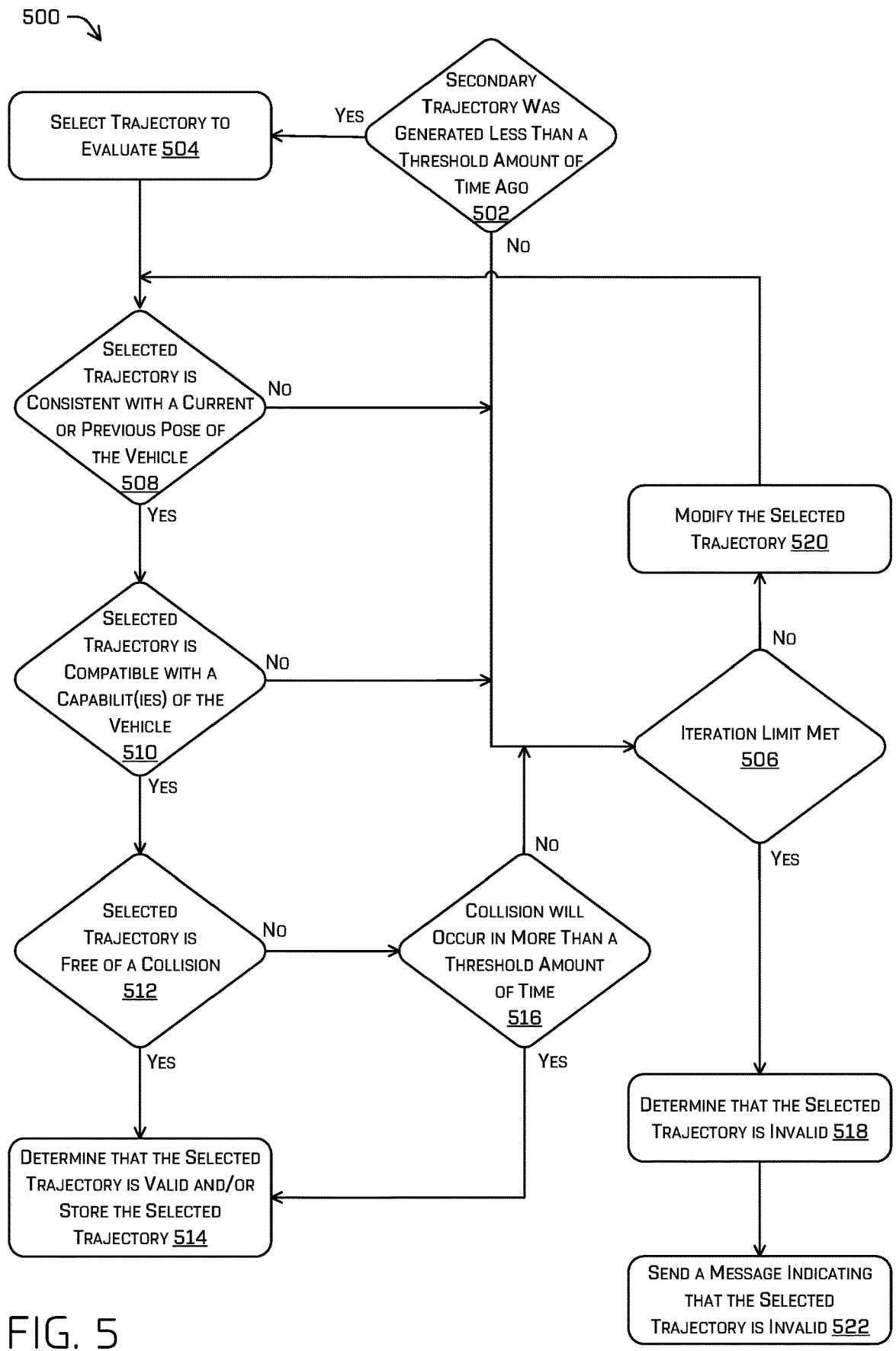
FIG. 5 illustrates an example process to determine if a trajectory for a vehicle is valid or invalid.

FIGS. 3, 4, and 5 illustrate example processes 300, 400, and 500 to perform one or more validation operations. The processes 300, 400, and 500 are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. The processes 300, 400, and/or 500 may be performed by any device or component, such as the autonomous vehicle 102, a service provider (e.g., a computing device of a service provider), or any other device.

FIG. 3 illustrates the example process 300 to determine if a trajectory for a vehicle is valid or invalid. In some examples, the process 300 may be performed for a primary trajectory. For instance, the process 300 may be performed by the trajectory validation component 218(1) of FIG. 2. In other examples, the process 300 may be performed for other trajectories, such as a secondary trajectory, a collision avoidance trajectory, and/or any other trajectory.

At operation 302, a system may determine if a trajectory for a vehicle was generated less than a threshold amount of time ago (e.g., threshold amount of time from a current time). For example, the system may reference a current time and a time that the trajectory was generated (e.g., from data associated with the trajectory and/or from data in a datastore). If the system determines that the trajectory was generated less than the threshold amount of time ago (e.g., indicating that the trajectory is not old), the process 300 may proceed to operation 304. Alternatively, if the system determines that the trajectory was not generated less than the threshold amount of time ago (e.g., indicating that the trajectory is old), the process 300 may proceed to operation 306.

At operation 304, the system may determine if the trajectory is consistent with a current or previous pose of a vehicle. For example, the system may determine if the trajectory would cause more than a threshold amount of change to a current pose and/or one or more previous poses (e.g., more than a threshold amount of change in orientation, position, heading, etc.). In some instances, the trajectory may be compared to multiple previous trajectories, such as the last three trajectories, to determine if there is more than a threshold amount of change from each of the previous trajectories. The system may store trajectories over time, so that one or more previous trajectories may be referenced. If the system determines that the trajectory is consistent with a current or previous pose of the vehicle, the process 300 may proceed to operation 308. Alternatively, if the system determines that the trajectory is inconsistent with a current or previous pose of the vehicle, the process 300 may proceed to operation 306.

At operation 308, the system may determine if the trajectory is compatible with a capabilit(ies) of the vehicle. A capability of the vehicle may be based on hardware and/or software components of the autonomous vehicle 102 and/or limitations of those components. In one example, the system may identify capabilities of the autonomous vehicle 102, such as a maximum steering angle, an amount of time to change from one steering angle to another steering angle, a maximum acceleration, and so on. If the trajectory requires a change past the maximum steering angle, requires the steering to change quicker than an amount of time needed to make a steering angle adjustment, and/or requires an acceleration above a maximum acceleration, the system may determine that the trajectory is incompatible with a capability of the vehicle. If the system determines that the trajectory is compatible with the capabilit(ies) of the vehicle, the process 300 may proceed to operation 310. Alternatively, if the system determines that the trajectory is incompatible with the capabilit(ies) of the vehicle, the process 300 may proceed to operation 306.

At operation 310, the system may determine if the trajectory is free of a collision. For example, the system may determine if the vehicle moving along a vehicle trajectory will collide with an object moving along an object trajectory. If so, the trajectory is associated with a collision. In some examples, the system may determine a probability of the vehicle colliding with the object and determine if the probability meets or exceeds a probability threshold. If the probability meets or exceeds the probability threshold, the system may determine that the vehicle will collide with the object. In examples, operation 310 may be performed for each object detected around the vehicle (e.g., to check for one or more collisions).

If the system determines that the trajectory is collision free, the process 300 may proceed to operation 312. Alternatively, if the system determines that the trajectory is not collision free (e.g., is associated with a collision), the process 300 may proceed to operation 314.

At operation 314, the system may determine if the collision will occur in more than a threshold amount of time. For example, the system may determine a time to last second braking (TTLSB) before colliding with an object. The time to last second braking may be a last possible time when the vehicle needs to initiate a maximum deceleration trajectory to avoid a collision with the object. If the time to last second braking is relatively far out in the future (e.g., more than a threshold amount of time), there may be time for the vehicle to correct the trajectory and avoid initiating a maximum deceleration trajectory. That is, the system does not need to initiate a maximum deceleration trajectory yet. To illustrate, if the time to last second braking for an object is in ten milliseconds, the system may determine that a collision will occur in less than a threshold amount of time. In contrast, if the time to last second braking is in two seconds, the system may determine that a collision will occur in more than a threshold amount of time. In examples, the system may evaluate a potential collision with each object around the vehicle (e.g., each object in an object list).

If the system determines that the collision will occur in more than the threshold amount of time (e.g., there is still time before a time to last second braking), the process 300 may proceed to operation 316. Alternatively, if the system determines that the collision will occur in the threshold amount of time or less than the threshold amount of time, the process 300 may proceed to operation 306.

At operation 306, the system may determine that the trajectory is invalid. In examples, the system may update a state of the trajectory to indicate that the trajectory is invalid. In some instances, the state may indicate why the trajectory is invalid (e.g., is associated with a collision, a time when a collision will occur, is inconsistent with a current/previous pose of the vehicle, is incompatible with a capability of the vehicle, etc.).

In some examples, the process 300 may proceed to operation 318 after performing operation 306. At operation 318, the system may send a message indicating that the trajectory is invalid. For example, the system may be a secondary system and send the message to a primary system to inform the primary system that a trajectory generated by the primary system is invalid. In examples, the message may indicate why the trajectory is invalid.

At operation 316, the system may send a message indicating that the trajectory is associated with a collision. For example, the system may be a secondary system and send the message to a primary system to inform the primary system that a trajectory generated by the primary system is associated with a collision in the future. In examples, the message may indicate one or more of a time to collision, extents of an object associated with a potential collision, a velocity of the object, a location of the object, or a point of collision (e.g., location of the detected collision).

At operation 312, the system may determine that the trajectory is valid and/or may store the trajectory. In examples, the system may update a state of the trajectory to indicate that the trajectory is valid (e.g., is collision free, etc.).

In one example, at 11:30:40 AM, the system may determine that the vehicle would collide with an object in five seconds (at 11:30:45 AM) if a trajectory under evaluation is used. The system may also determine that an amount of time needed to stop the vehicle (e.g., with a maximum deceleration trajectory) and avoid a collision with the object is three seconds (e.g., based on a velocity of the vehicle and/or the object). The system may use such information to determine a last possible time when the vehicle needs to initiate a maximum deceleration trajectory to avoid a collision (also referred to as a time to last second braking (TTLSB)). In this example, the time to last second braking is 11:30:42 AM. Here, the system may determine that the collision will occur in more than a threshold amount of time, send a message indicating such, and designate the trajectory as valid for now. At 11:30:42 AM (two seconds in the future), the system may determine if there is a potential collision for the vehicle (e.g., the vehicle is still on course to collide with the object based on the trajectory or a new trajectory). If a potential collision is detected, the system may initiate a maximum deceleration trajectory (or another maneuver) to avoid the collision.

FIG. 4 illustrates the example process 400 to determine if a trajectory for a vehicle is valid or invalid. In some examples, the process 400 may be performed by the trajectory validation component 218(2) of FIG. 2. In other examples, the process 400 may be performed by other components and/or for other trajectories.

At operation 402, a system may determine if a secondary trajectory for a vehicle was generated less than a threshold amount of time ago. For example, the system may determine if a secondary trajectory currently being output by a primary system was generated less than a threshold amount of time ago. If the system determines that the secondary trajectory was generated less than the threshold amount of time ago, the process 400 may proceed to operation 404. Alternatively, if the system determines that the secondary trajectory was not generated less than the threshold amount of time ago, the process 400 may proceed to operation 406.

At operation 404, the system may select a trajectory to evaluate. In one example, if a primary trajectory is currently being used to control a vehicle, then the system may select a secondary trajectory that passes the evaluation at operation 402 (e.g., a secondary trajectory that was generated less than a threshold amount of time ago). In another example, if a current trajectory that is being used has a lower level than a primary trajectory (e.g., a secondary trajectory, a collision avoidance trajectory, or any other lower level trajectory), and a release signal has been received to release control to a primary trajectory, then the system may select a secondary trajectory that passes the evaluation at operation 402. In yet another example, if a release signal has not been received to release control from a previous secondary trajectory, the system may select the previous secondary trajectory.

As such, at operation 404, the system may select a previously stored secondary trajectory or a secondary trajectory currently output from a primary system. To do so, the system may determine a selected state (e.g., primary trajectory state, secondary trajectory state, collision avoidance trajectory state, etc.) and determine whether or not a release signal has been received to release control to a higher level trajectory. For example, a secondary trajectory that is currently being output by a primary system may be selected if another secondary trajectory has not been previously latched onto or a release signal has been received. Further, a secondary trajectory that has previously been output by the primary system may be selected if such secondary trajectory has been latched onto and a release signal has not been received.

At operation 408, the system may determine if the selected trajectory is consistent with a current or previous pose of the vehicle. If the system determines that the selected trajectory is consistent with a current or previous pose of the vehicle, the process 400 may proceed to operation 410. Alternatively, if the system determines that the trajectory is inconsistent with a current or previous pose of the vehicle, the process 400 may proceed to operation 406.

At operation 410, the system may determine if the selected trajectory is compatible with a capabilit(ies) of the vehicle. If the system determines that the selected trajectory is compatible with the capabilit(ies) of the vehicle, the process 400 may proceed to operation 412. Alternatively, if the system determines that the selected trajectory is incompatible with the capabilit(ies) of the vehicle, the process 400 may proceed to operation 406.

At operation 412, the system may determine if the trajectory is free of a collision. If the system determines that the trajectory is collision free, the process 400 may proceed to operation 414. Alternatively, if the system determines that the trajectory is not collision free (e.g., is associated with a collision), the process 400 may proceed to operation 416.

At operation 416, the system may determine if the collision will occur in more than a threshold amount of time. If the system determines that the collision will occur in more than the threshold amount of time (e.g., there is still time before a time to last second braking), the process 400 may proceed to operation 414. In some examples when proceeding along the route to operation 414, the system may send a message indicating that the trajectory is associated with a collision, similar to operation 316 in FIG. 3. Alternatively, if the system determines that the collision will occur in the threshold amount of time or less than the threshold amount of time, the process 400 may proceed to operation 406.

At operation 406, the system may determine that the selected trajectory is invalid. In examples, the system may update a state of the selected trajectory to indicate that the selected trajectory is invalid. In some instances, the state may indicate why the selected trajectory is invalid.

In some examples, the process 400 may proceed to operation 418 after performing operation 406. At operation 418, the system may send a message indicating that the trajectory is invalid. For example, the system may be a secondary system and send the message to a primary system to inform the primary system that a trajectory generated by the primary system is invalid. In examples, the message may indicate why the trajectory is invalid.

At operation 414, the system may determine that the selected trajectory is valid and/or may store the selected trajectory. In examples, the system may update a state of the selected trajectory to indicate that the selected trajectory is valid. In at least some examples such a determination may also be sent to the primary system indicating that the secondary trajectory is valid.

FIG. 5 illustrates the example process 500 to determine if a trajectory for a vehicle is valid or invalid. In some examples, the process 500 may be performed by the trajectory validation component 218(3) of FIG. 2. In other examples, the process 500 may be performed by other components and/or for other trajectories.

At operation 502, a system may determine if a secondary trajectory for a vehicle was generated less than a threshold amount of time ago. For example, the system may determine if a secondary trajectory currently being output by a primary system was generated less than a threshold amount of time ago. If the system determines that the secondary trajectory was generated less than the threshold amount of time ago, the process 500 may proceed to operation 504. Alternatively, if the system determines that the secondary trajectory was not generated less than the threshold amount of time ago, the process 500 may proceed to operation 506.

At operation 504, the system may select a trajectory to evaluate. In one example, if a primary trajectory is currently being used to control a vehicle, then the system may select a secondary trajectory that passes the evaluation at operation 502 (e.g., a secondary trajectory that was generated less than a threshold amount of time ago). In another example, if a current trajectory that is being used has a lower level than a primary trajectory (e.g., a secondary trajectory, a collision avoidance trajectory, or any other lower level trajectory), and a release signal has been received to release control to a primary trajectory, then the system may select a secondary trajectory that passes the evaluation at operation 502. In yet another example, if a release signal has not been received to release control from a previous collision avoidance trajectory, the system may select the previous collision avoidance trajectory.

As such, at operation 504, the system may select a previously stored collision avoidance trajectory or a secondary trajectory currently output from a primary system. To do so, the system may determine a selected state (e.g., primary trajectory state, secondary trajectory state, collision avoidance trajectory state, etc.) and determine whether or not a release signal has been received to release control to a higher level trajectory. For example, a secondary trajectory that is currently being output by a primary system may be selected if another secondary trajectory has not been previously latched onto, a release signal has been received, or the system otherwise determines that additional updates should be ignored (e.g., where the system may be unable to verify the integrity of the additional secondary trajectory). Further, a previous collision avoidance trajectory may be selected if such collision avoidance trajectory has been latched onto and a release signal has not been received. In some examples, a collision avoidance trajectory (determined/output by the process 500, as discussed below) may be a secondary trajectory. In other examples, a collision avoidance trajectory (determined/output by the process 500) may be a modified secondary trajectory.

At operation 508, the system may determine if the selected trajectory is consistent with a current or previous pose of the vehicle. If the system determines that the selected trajectory is consistent with a current or previous pose of the vehicle, the process 500 may proceed to operation 510. Alternatively, if the system determines that the trajectory is inconsistent with a current or previous pose of the vehicle, the process 500 may proceed to operation 506.

At operation 510, the system may determine if the selected trajectory is compatible with a capabilit(ies) of the vehicle. If the system determines that the selected trajectory is compatible with the capabilit(ies) of the vehicle, the process 500 may proceed to operation 512. Alternatively, if the system determines that the selected trajectory is incompatible with the capabilit(ies) of the vehicle, the process 500 may proceed to operation 506.

At operation 512, the system may determine if the trajectory is free of a collision. If the system determines that the trajectory is collision free, the process 500 may proceed to operation 514. Alternatively, if the system determines that the trajectory is not collision free (e.g., is associated with a collision), the process 500 may proceed to operation 516.

At operation 516, the system may determine if the collision will occur in more than a threshold amount of time. If the system determines that the collision will occur in more than the threshold amount of time (e.g., there is still time before a time to last second braking), the process 500 may proceed to operation 514. Alternatively, if the system determines that the collision will occur in the threshold amount of time or less than the threshold amount of time, the process 500 may proceed to operation 506.

Although illustrated in FIG. 5, in some examples operation 516 may not be performed. For example, if a trajectory is associated with a collision, the process 500 may proceed to operation 506.

At operation 514, the system may determine that the selected trajectory is valid and/or may store the selected trajectory. In examples, the system may update a state of the selected trajectory to indicate that the selected trajectory is valid.

At operation 506, the system may determine if an iteration limit (sometime referred to as limit) is met. The iteration limit may be used so that if the system is unable to determine an acceptable collision avoidance trajectory within a number of iterations, the collision avoidance trajectory is considered invalid. This may limit the amount of time spent attempting to find an acceptable collision avoidance trajectory. In examples, the iteration limit may be based on a time to last second braking (e.g., set to a number of iterations that can be reached before a time to last second braking). In examples, in each iteration, operation 520 is performed.

If the system determines that the iteration limit is met, the process 500 may proceed to operation 518. Alternatively, if the system determines that the iteration limit is not met, the process 500 may proceed to operation 520.

At operation 520, the system may modify the selected trajectory and return to perform operation 508 and so on. In some examples, the system may add an amount of deceleration that is needed to cause the vehicle to stop before colliding with an object. This may be based on a current velocity of the vehicle, a predicted trajectory of the object, and/or a current or predicted velocity of the object. Alternatively, or additionally, the system may modify the selected trajectory in another manner, such as by changing a steering angle, adding acceleration, etc. This may also avoid a collision with an object. In examples, modifying the selected trajectory may create a collision avoidance trajectory.

At operation 518, the system may determine that the selected trajectory is invalid. In examples, the system may update a state of the selected trajectory to indicate that the selected trajectory is invalid. In some instances, the state may indicate why the selected trajectory is invalid.

In some examples, the process 500 may proceed to operation 522 after performing operation 518. At operation 522, the system may send a message indicating that the selected trajectory is invalid. For example, the system may be a secondary system and send the message to a primary system to inform the primary system that a trajectory is invalid. In examples, the message may indicate why the trajectory is invalid.

In examples, a trajectory that is determined to be valid at operation 514 may be a secondary trajectory without any deceleration (or other modification) applied at operation 520. For instance, if no modification is necessary to a secondary trajectory selected at operation 504, since the secondary trajectory passes the checks at operations 508, 510, and 512, the secondary trajectory may be determined/output by the process 500. In other examples, a trajectory that is determined to be valid at operation 514 may be a secondary trajectory with deceleration (or other modification) applied. In examples, either type of trajectory that is determined/output (and/or stored for future reference) by performing the process 500 may be referred to as a collision avoidance trajectory.

In examples, if a maximum amount of deceleration/modification is applied to a selected trajectory (e.g., in view the capabilities of the vehicle and by performing operation 520 one or more times), and the selected trajectory is still associated with a collision, the system may override the detected collision and proceed to determine that the selected trajectory is valid at operation 514. This may allow the modified trajectory to be used (which is a collision avoidance trajectory with a maximum amount of deceleration/modification applied). In examples, this may be more beneficial than designating the modified trajectory as invalid and initiating a maximum deceleration trajectory (e.g., an emergency stop trajectory), since a maximum deceleration trajectory may lock a steering angle of the vehicle while the collision avoidance trajectory may maintain lateral tracking (e.g., cause the vehicle to continue along the collision avoidance trajectory). In examples, if the collision avoidance trajectory with the maximum amount of deceleration/modification applied is selected to be used (e.g., determined/output from the process 500), a signal may be sent to one or more components of the vehicle to pre-tension a seatbelt, prepare an airbag for deployment, etc.

Figure 6:
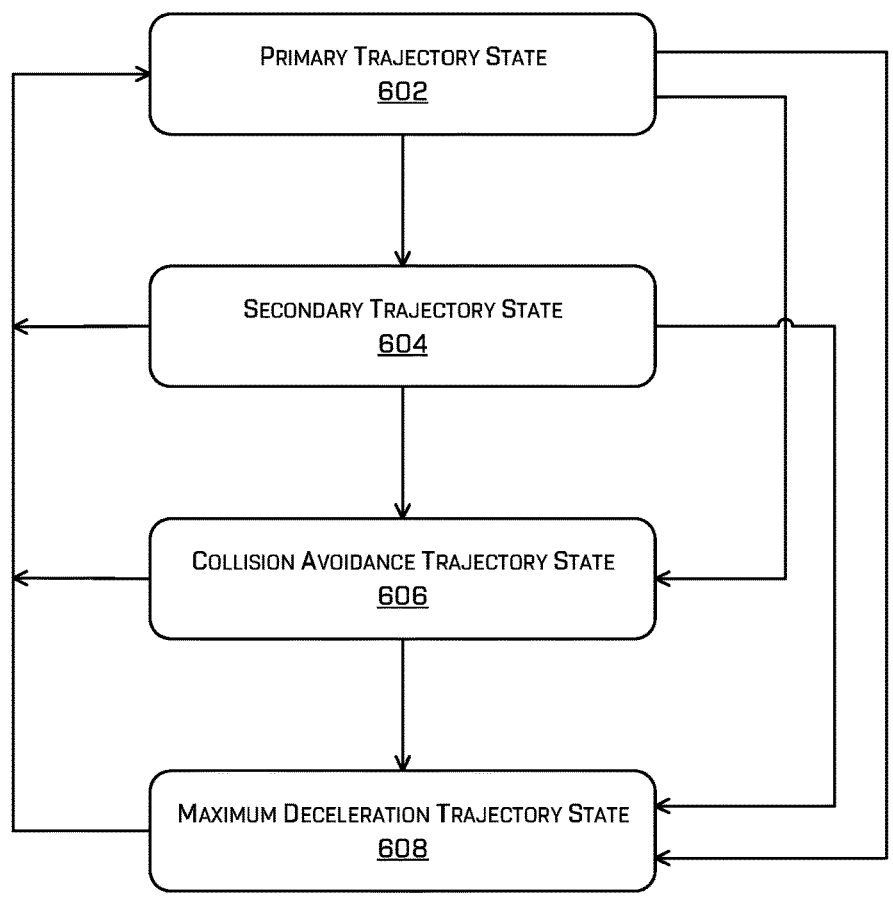
FIG. 6 illustrates an example hierarchy of states that may be implemented by a secondary system.

FIG. 6 illustrates an example hierarchy 600 of states 602-608 that may be implemented by a secondary system, such as by the trajectory selection component 220. For example, the primary trajectory state 602 may be active when a primary trajectory is selected to control a vehicle, the secondary trajectory state 604 may be active when a secondary trajectory is selected, the collision avoidance trajectory state 606 may be active when a collision avoidance trajectory is selected, and the maximum deceleration trajectory state 608 may be active when a maximum deceleration trajectory (e.g., emergency stop trajectory) is selected. In FIG. 6, the hierarchy 600 is ordered according to levels, with the highest level state being at the top (the primary trajectory state 602) and the lowest level state being at the bottom (the maximum deceleration trajectory state 608).

The secondary system may generally transition to a lower level state when a higher level state is found to be invalid. The secondary system may transition from a current state to any lower state, as illustrated by the lines going down. In at least some examples, the current state may be associated with the highest valid state with no invalid states below (e.g., if a secondary trajectory state 604 is invalid, yet a collision avoidance trajectory state is invalid, such a system may default to the maximum deceleration trajectory state 608). Further, in examples, in order to transition up the hierarchy 600, the secondary system may wait to receive a signal to release control from a lower level state. For instance, if the secondary system is currently controlling the vehicle based on a collision avoidance trajectory, and thus, the secondary system is operating in the collision avoidance trajectory state 606, the secondary system may transition back to the primary trajectory state 602 when a signal is received to release control back to the primary trajectory state 602 (where the vehicle is controlled based on a primary trajectory).

Figure 7A:
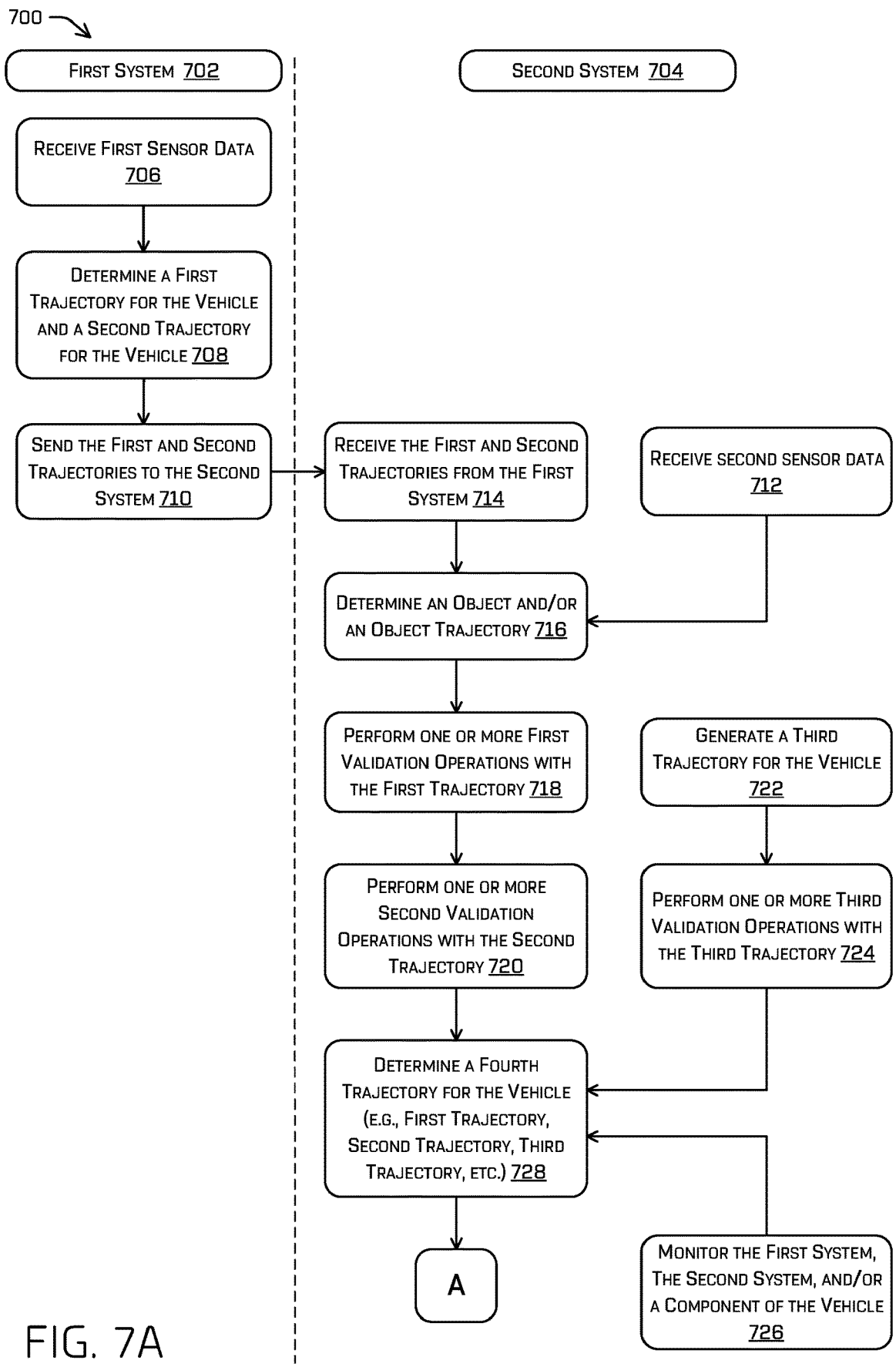
FIGS. 7A-7B illustrate an example process to perform the techniques discussed herein.
Figure 7B:
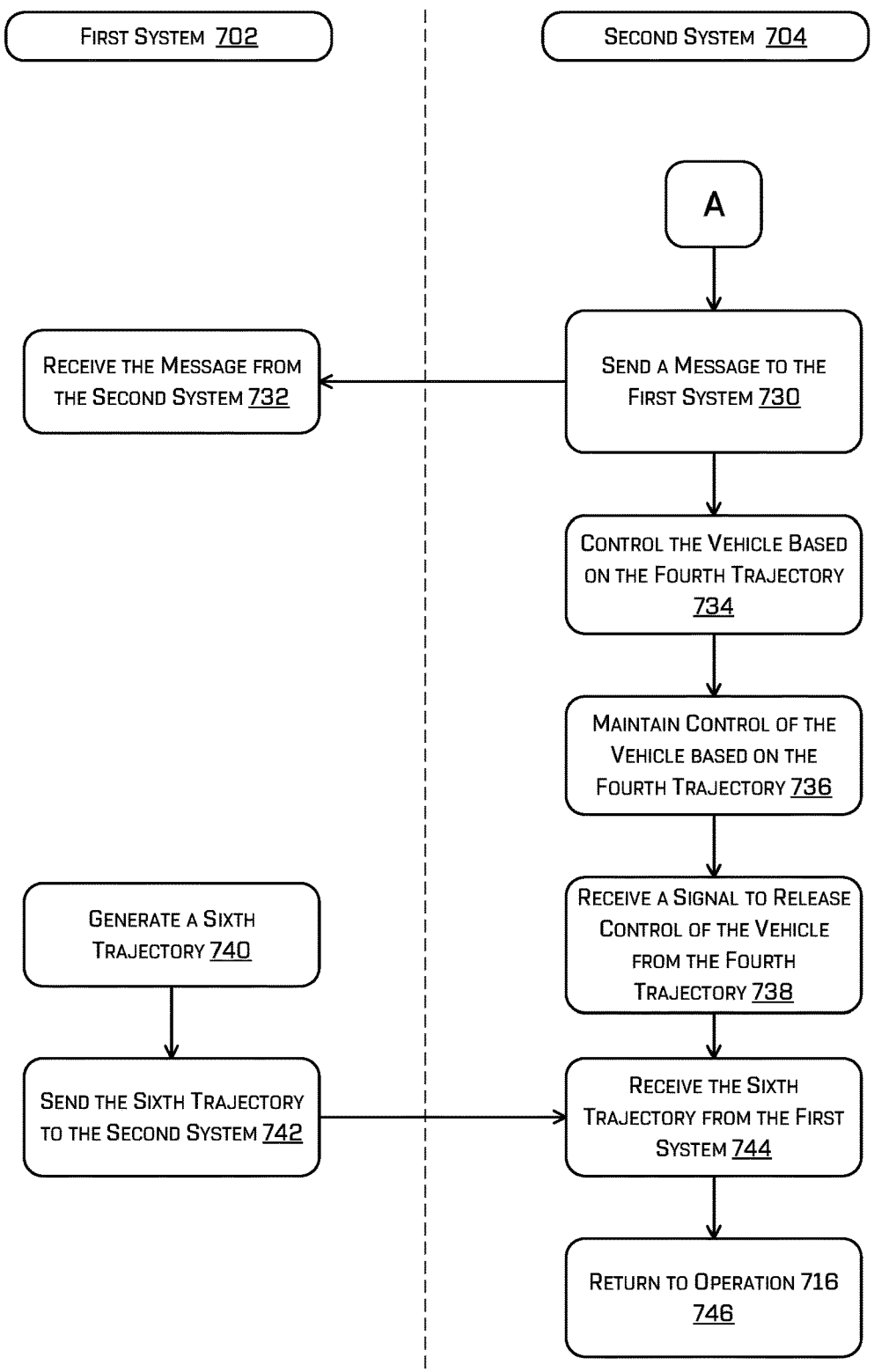

FIGS. 7A-7B illustrate an example process 700 to perform the techniques discussed herein. The process 700 is illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. The process 700 may be performed by any device or component, such as the autonomous vehicle 102, a service provider (e.g., a computing device of a service provider), or any other device.

For ease of illustration, the process 700 will be discussed as being performed by a first system 702 (sometimes referred to as a first component) and a second system 704 (sometimes referred to as a second component). For example, the first system 702 may comprise the primary system 106 of FIGS. 1 and 2, while the second system 704 may comprise the secondary system 108 of FIGS. 1 and 2.

In FIG. 7A, at operation 706, the first system 702 may receive first sensor data. For example, the first system 702 may receive one or more of LIDAR data, RADAR data, image data, depth data (time of flight, structured light, etc.), wheel encoder data, IMU data, etc. from a sensor(s) of a vehicle.

At operation 708, the first system 702 may determine a first trajectory for the vehicle and a second trajectory for the vehicle. For example, the first system 702 may analyze the first sensor data to generate the first and second trajectories. In examples, the first system 702 may perform localization, perception, prediction, and/or planning operations to generate the first and second trajectories. In examples, the second trajectory may be a contingent trajectory for the first trajectory.

At operation 710, the first system 702 may send the first and second trajectories to the second system 704.

At operation 712, the second system 704 may receive second sensor data. For example, the second system 704 may receive one or more of LIDAR data, RADAR data, image data, wheel encoder data, IMU data, depth data (time of flight, structured light, etc.), etc. from the sensor(s) of the vehicle. In some examples, the second sensor may include a subset of the first sensor data, such as LIDAR data, RADAR data, wheel encoder data, IMU data, GPS data, and/or time of flight data. In other examples, the second sensor data may be the same or include more data than the first sensor data.

At operation 714, the second system 704 may receive the first and second trajectories from the first system 702.

At operation 716, the second system 704 may determine an object in an environment and/or determine an object trajectory for the object. For example, the second system 704 may detect the object and/or predict the object trajectory for the object based on the second sensor data.

At operation 718, the second system 704 may perform one or more first validation operations with the first trajectory. For example, the second system 704 may perform the one or more first validation operations with the first trajectory for the vehicle and the object trajectory for the object to determine a first state associated with the first trajectory. In examples, the one or more first validation operations comprise determining whether the first trajectory was generated less than a threshold amount of time ago, determining whether the first trajectory is consistent with a current or previous pose of the vehicle, determining whether the first trajectory is compatible with a capability of the vehicle, and/or determining whether the vehicle moving along the first trajectory will collide with the object moving along the object trajectory (e.g., performing first collision detection). In examples, the first state indicates that the first trajectory is valid, the first trajectory is invalid, or the first trajectory will be invalid due to an estimated collision occurring in more than a threshold amount of time. In examples, the second system 704 may evaluate the first trajectory for each object detected in an environment (e.g., determine if there is a potential collision for each object detected). Here, the first trajectory may be valid if there are no collisions, and may be invalid if there is just one collision. In at least some examples, the objects selected for collision detection may be determined in order from closest (i.e., most proximate potential collision) to furthest.

At operation 720, the second system 704 may perform one or more second validation operations with the second trajectory. For example, the second system 704 may perform the one or more second validation operations with the second trajectory for the vehicle and the object trajectory for the object to determine a second state associated with the second trajectory. In examples, the one or more second validation operations comprise determining whether the second trajectory was generated less than a threshold amount of time ago, determining whether the second trajectory is consistent with a current or previous pose of the vehicle, determining whether the second trajectory is compatible with a capability of the vehicle, and/or determining whether the vehicle moving along the second trajectory will collide with the object moving along the object trajectory (e.g., performing second collision detection). In examples, the second state indicates that the second trajectory is valid, the second trajectory is invalid, or the second trajectory will be invalid due to an estimated collision occurring in more than a threshold amount of time. In examples, the second system 704 may evaluate the second trajectory for each object detected in an environment.

At operation 722, the second system 704 may generate a third trajectory for the vehicle. For example, the second system 704 may generate the third trajectory based on the second trajectory (or the first trajectory, in some cases). The third trajectory may comprise a deceleration or other modification along the second trajectory or any other maneuver (e.g., a collision avoidance trajectory). In examples, the second system 704 may apply a deceleration/modification to the second trajectory any number of times based on an iteration limit and/or apply a deceleration/modification up to a maximum amount of deceleration/modification that is available to apply.

At operation 724, the second system 704 may perform one or more third validation operations with the third trajectory. For example, the second system 704 may perform the one or more third validation operations with the third trajectory for the vehicle and the object trajectory for the object to determine a third state associated with the third trajectory. In examples, the one or more third validation operations comprise determining whether the third trajectory was generated less than a threshold amount of time ago, determining whether the third trajectory is consistent with a current or previous pose of the vehicle, determining whether the third trajectory is compatible with a capability of the vehicle, and/or determining whether the vehicle moving along the third trajectory will collide with the object moving along the object trajectory (e.g., performing third collision detection). In examples, the second state indicates that the third trajectory is valid, the third trajectory is invalid, or the third trajectory will be invalid due to an estimated collision occurring in more than a threshold amount of time.

In examples, any number of the one or more first validation operations, the one or more second validation operations, and/or the one or more third validations operations may be the same. In other examples, any number of validation operations may be different.

At operation 726, the second system 704 may monitor the first system 702, the second system 704, and/or a component of the vehicle. Based on the monitoring, the second system 704 may determine an error with the first system 702, the second system 704, and/or the component of the vehicle.

At operation 728, the second system 704 may determine a fourth trajectory for the vehicle. For example, the second system 704 may, based on the first state, the second state, and/or the third state, select, as the fourth trajectory, the first trajectory, the second trajectory, the third trajectory, or a fifth trajectory (e.g., a maximum deceleration trajectory).

In examples, the second system 704 may select the first trajectory when the first state indicates that the first trajectory is valid. Further, in examples, the second system 704 may select the second trajectory when (i) the first state indicates that the first trajectory is invalid (e.g., associated with an estimated collision in less than a threshold amount of time) and the second state indicates that the second trajectory is valid, or (ii) an error is detected with the first system 702, the second system 704, and/or a component of the vehicle and the second state indicates that the second trajectory is valid.

Moreover, in examples, the second system 704 may select the third trajectory (e.g., collision avoidance trajectory) when (i) the first state indicates that the first trajectory is invalid, the second state indicates that the second trajectory is invalid, and the third state indicates that the third trajectory is valid, (ii) an error is detected with the first system 702, the second system 704, and/or a component of the vehicle, the second state indicates that the second trajectory is invalid, and the third state indicates that the third trajectory is valid, or (iii) the first state indicates that the first trajectory is invalid, the second state indicates that the second trajectory is invalid, the third trajectory is associated with a collision, the third trajectory is associated with a maximum amount of deceleration/modification, and an iteration limit has not been met in applying a deceleration/modification to the third trajectory. As such, in some examples, the second system 704 may determine if a maximum amount of deceleration/modification has been applied to generate the third trajectory and/or if the iteration limit has been met.

Further, in examples, the second system 704 may select a maximum deceleration trajectory (e.g., an emergency stop trajectory) if the first trajectory, the second trajectory, or the third trajectory are not selected as discussed above (e.g., the first trajectory is invalid, the second trajectory is invalid, and the third trajectory is invalid). As noted above, the third trajectory may be invalid due to an iteration limit being met in applying a deceleration/modification to the third trajectory.

In FIG. 7B, at operation 730, the second system 704 may send a message to the first system 702 (e.g., if a trajectory is invalid). The message may indicate that a trajectory is invalid and/or that the second system 704 will intervene if control of the vehicle is maintained based on the trajectory. In some examples, the message may not be sent (e.g., where the first trajectory is selected). In at least some examples, such message data may include, for example, a time to collision, a point of collision, information about the potentially colliding object (e.g., any one or more of an extent of an object, object identifier, object position, object velocity), etc.

Additionally, or alternatively, in examples, if a maximum deceleration trajectory or a collision avoidance trajectory (with a maximum amount of deceleration/modification applied) is selected at operation 728, a message or signal may be sent to one or more components of the vehicle to pre-tension a seatbelt, prepare an airbag for deployment, etc.

At operation 732, the first system 702 may receive the message from the second system 704. In examples, the first system 702 may adjust a trajectory, such as a primary trajectory, based on the message.

At operation 734, the second system 704 may control the vehicle based on the fourth trajectory. For example, the second system 704 may send a signal to a drive manager component, a system controller(s), etc. instructing the control the vehicle based on the fourth trajectory.

At operation 736, the second system 704 may maintain control of the vehicle based on the fourth trajectory. For example, the second system 704 may maintain the second system 704 in a state that is latched onto the second trajectory, the third trajectory, and/or a maximum deceleration trajectory, which may include continuing to send a signal to the system controller(s).

At operation 738, the second system 704 may receive a signal to release control of the vehicle from the fourth trajectory. In examples, the signal may be received from a teleoperations system or another system. The signal may indicate that the vehicle is clear of a collision or otherwise clear to return to normal operation. For example, if the fourth trajectory caused the vehicle to come to a stop due to a potential collision, the signal may indicate that its safe for the vehicle to move again.

At operation 740, the first system 702 may generate a sixth trajectory. The sixth trajectory may comprise a primary/main trajectory.

At operation 742, the first system 702 may send the sixth trajectory to the second system 704.

At operation 744, the second system 704 may receive the sixth trajectory from the first system 702.

At operation 746, the second system 704 return to operation 716 to evaluate the sixth trajectory and control the vehicle based on the sixth trajectory if valid.

Figure 8:
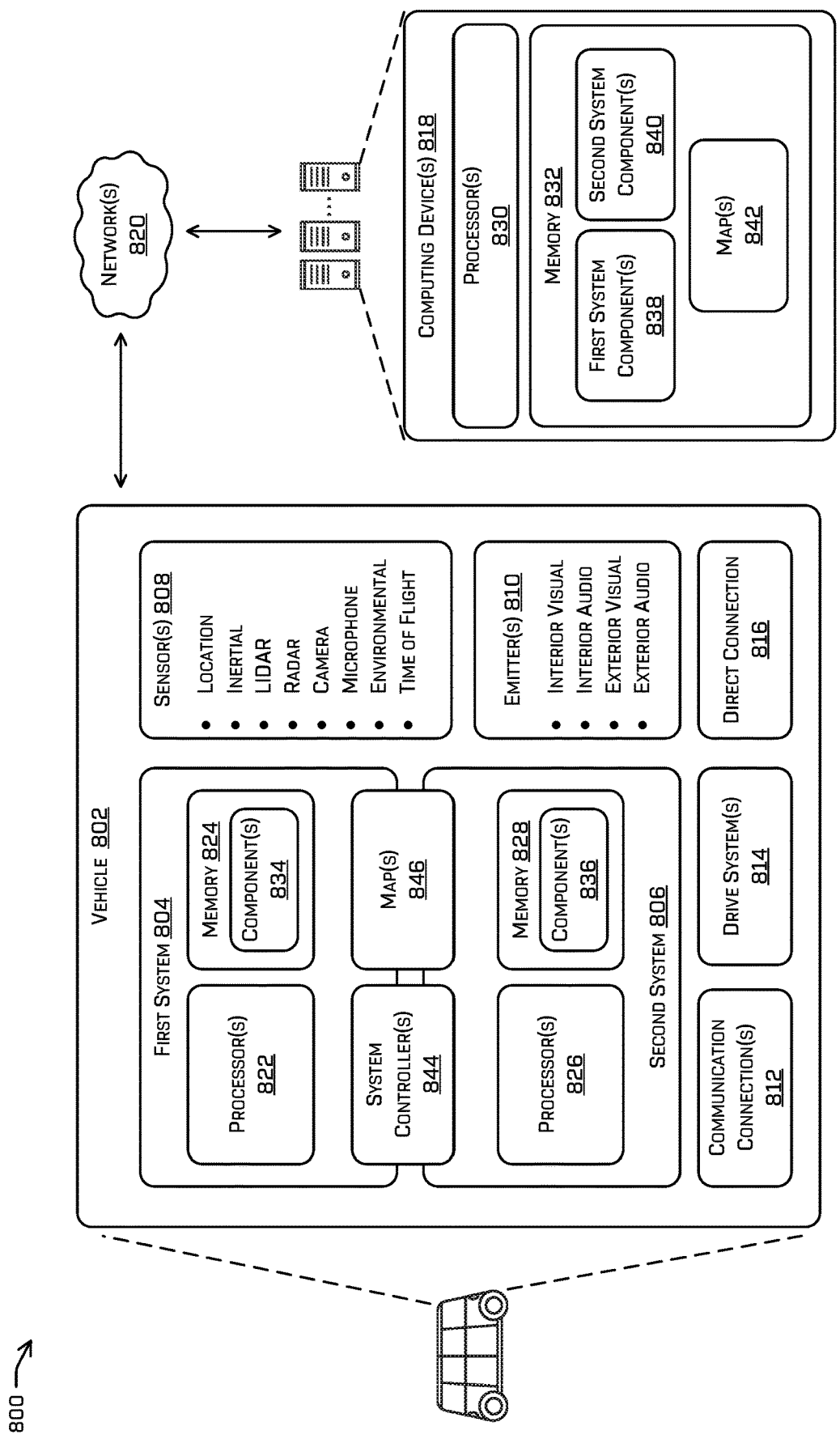
FIG. 8 depicts a block diagram of an example system for implementing the techniques described herein.

FIG. 8 depicts a block diagram of an example system 800 for implementing the techniques described herein. In some instances, the system 800 may include a vehicle 802, which may correspond to the autonomous vehicle 102 in FIG. 1. In some instances, the vehicle 802 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 802 may be a fully or partially autonomous vehicle having any other level or classification. Moreover, in some instances, the techniques described herein may be usable by non-autonomous vehicles as well.

The vehicle 802 may include a first system 804 (e.g., a first computing device), a second system 806 (e.g., a second computing device), one or more sensors 808, one or more emitters 810, one or more communication connections 812, one or more drive systems 814, and/or a direct connection 816 (e.g., for physically coupling the vehicle 802 to exchange data and/or to provide power).

In some instances, the sensor(s) 808 may include light detection and ranging (LIDAR) sensors, RADAR sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), cameras (e.g., red-green-blue (RGB), infrared (IR), intensity, depth, time of flight, etc.), microphones, wheel encoders, environment sensors (e.g., temperature sensors, humidity sensors, light sensors, pressure sensors, etc.), etc. The sensor(s) 808 may include multiple instances of each of these or other types of sensors. For instance, the LIDAR sensors may include individual LIDAR sensors located at the corners, front, back, sides, and/or top of the vehicle 802. As another example, the cameras may include multiple cameras disposed at various locations about the exterior and/or interior of the vehicle 802. The sensor(s) 808 may provide input to the first system 804 and/or the second system 806.

The vehicle 802 may also include the emitter(s) 810 for emitting light and/or sound, as described above. The emitter(s) 810 in this example may include interior audio and visual emitter(s) to communicate with passengers of the vehicle 802. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 810 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 802 may also include the communication connection(s) 812 that enable communication between the vehicle 802 and one or more other local or remote computing device(s). For instance, the communication connection(s) 812 may facilitate communication with other local computing device(s) on the vehicle 802 and/or the drive system(s) 814. Also, the communication connection(s) 812 may additionally or alternatively allow the vehicle 802 to communicate with other nearby computing device(s) (e.g., other nearby vehicles, traffic signals, etc.). The communication connection(s) 812 may additionally or alternatively enable the vehicle 802 to communicate with a computing device 818.

The communication connection(s) 812 may include physical and/or logical interfaces for connecting the first system 804 and/or the second system 806 to another computing device or a network, such as network(s) 820. For example, the communication connection(s) 812 may enable Wi-Fi-based communication such as via frequencies defined by the IEEE 800.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the first system 804, the second system 806, and/or the sensor(s) 808 may send sensor data, via the network(s) 820, to the computing device(s) 818 at a particular frequency, after a lapse of a predetermined period of time, in near real-time, etc.

In some instances, the vehicle 802 may include the drive system(s) 814. In some instances, the vehicle 802 may have a single drive system 814. In some instances, the drive system(s) 814 may include one or more sensors to detect conditions of the drive system(s) 814 and/or the surroundings of the vehicle 802. By way of example and not limitation, the sensor(s) of the drive system(s) 814 may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, RADAR sensors, etc. Some sensors, such as the wheel encoders may be unique to the drive system(s) 814. In some cases, the sensor(s) on the drive system(s) 814 may overlap or supplement corresponding systems of the vehicle 802 (e.g., sensor(s) 808).

The drive system(s) 814 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 814 may include a drive system controller which may receive and preprocess data from the sensor(s) and to control operation of the various vehicle systems. In some instances, the drive system controller may include one or more processors and memory communicatively coupled with the one or more processors. The memory may store one or more modules to perform various functionalities of the drive system(s) 814. Furthermore, the drive system(s) 814 may also include one or more communication connection(s) that enable communication by the respective drive system with one or more other local or remote computing device(s).

The first system 804 may include one or more processors 822 and memory 824 communicatively coupled with the one or more processors 822. The second system 806 may include one or more processors 826 and memory 828 communicatively coupled with the one or more processors 826. The computing device(s) 818 may also include a processor(s) 830 and/or memory 832 communicatively coupled with the processor(s) 830. The processor(s) 822, 826, and/or 830 may be any suitable processor capable of executing instructions to process data and perform operations as described herein. By way of example and not limitation, the processor(s) 822, 826, and/or 830 may comprise one or more central processing units (CPUs), graphics processing units (GPUs), integrated circuits (e.g., application-specific integrated circuits (ASICs), etc.), gate arrays (e.g., field-programmable gate arrays (FPGAs), etc.), and/or any other device or portion of a device that processes electronic data to transform that electronic data into other electronic data that may be stored in registers and/or memory.

Memory 824, 828, and/or 832 may be examples of non-transitory computer-readable media. The memory 824, 828, and/or 832 may store an operating system and one or more software applications, instructions, programs, and/or data to implement the methods described herein and the functions attributed to the various systems. In various implementations, memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In examples, the memory 824 of the first system 804 may store one or more components 834. For example, the first system 804 may correspond to the primary system 106 of FIGS. 1 and 2 and store the localization component 202, the perception component 204, the prediction component 206, and/or the planning component 208. The processor(s) 822 may execute the one or more components 834 to cause the first system 804 to perform various actions discussed herein.

In examples, the memory 828 of the second system 806 may store one or more components 836. For example, the second system 806 may correspond to the secondary system 108 of FIGS. 1 and 2 and store the localization component 210, the perception/prediction component 212, the trajectory management component 128, the monitor component 214, and/or the drive manager component 224. The processor(s) 826 may execute the one or more components 836 to cause the second system 806 to perform various actions discussed herein.

Though depicted in FIG. 8 as residing in the memory 824 and/or the memory 828 for illustrative purposes, it is contemplated that the component(s) 834 and/or the component(s) 836 may additionally, or alternatively, be accessible to the computing device(s) 818 (e.g., stored remotely). For example, the memory 832 may store a first system component(s) 838 corresponding to at least a portion of the component(s) 834 and/or store a second system component(s) 840 corresponding to at least a portion of the component(s) 836. Additionally, or alternatively, the memory 832 may store one or more maps 842.

In at least one example, the first system 804 and/or the second system 806 may include one or more system controllers 844, which may be configured to control steering, propulsion, braking, safety, emitters, communication, and other systems of the vehicle 802. In examples, the system controller(s) 844 may be stored in the memory 824 and/or the memory 828. The system controller(s) 844 may communicate with and/or control corresponding systems of the drive system(s) 814 and/or other components of the vehicle 802. In some instances, the system controller(s) 844 may translate a trajectory generated by the first system 804, generated by the second system 806, and/or selected by the second system 806 into instructions useable by the drive system(s) 814 to cause the vehicle 802 to traverse the trajectory.

In some instances, the first system 804, the second system 806, the system controller(s) 844, and/or any component thereof may process sensor data, as described above, and may send their respective outputs, over the network(s) 820, to the computing device(s) 818 (e.g., at a particular frequency, after a lapse of a predetermined period of time, in near real-time, etc.)

The first system 804 and/or the second system 806 may store one or more maps 846, which may be used by the vehicle 802 to navigate within an environment. For the purpose of this discussion, a map may be any number of data features modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some instances, the map may be stored in a tiled format, such that individual tiles of the map represent a discrete portion of an environment, and may be loaded into working memory as needed. In some instances, the map may include an occupancy grid, point map, landmark map, and/or graph of pose constraints. In some instances, the vehicle 802 may be controlled based at least in part on the map(s) 846. That is, the map(s) 846 may be used in conjunction with a localization component of the first system 804 (and/or a localization component of the second system 806 in some examples) to determine a location of the vehicle 802, identify objects in an environment, and/or generate routes and/or trajectories to navigate within an environment.

In some instances, aspects of some or all of the components discussed herein may include any models, algorithms, and/or machine learning algorithms. For example, the component(s) 834 in the memory 824 (and/or the memory 828 or 832) may be implemented as a neural network.

It should be noted that while FIG. 8 is illustrated as a distributed system, in alternative examples, components of the vehicle 802 may be associated with the computing device(s) 818 and/or components of the computing device(s) 818 may be associated with the vehicle 802. That is, the vehicle 802 may perform one or more of the functions associated with the computing device(s) 818, and vice versa.

In some examples, the one or more components 836 (and/or the one or more components 834) include an estimation and validation component to determine a direction of motion of the vehicle 802, a velocity of the vehicle 802, an acceleration of the vehicle 802, a yaw rate of the vehicle 802, a yaw acceleration, and/or a steering angle of the vehicle 802. In examples, such information may be based on signals from the system controller(s) 844, the drive system(s) 814, etc. The estimation and validation component may generate data indicating one or more of such information and provide the data to various components of the second system 806 and/or the first system 804.

Further, in some examples, the one or more components 836 (and/or the one or more components 834) may include a data processing component(s) to filter sensor data to generate a reduced amount of data. In one example, the data processing component(s) may remove data from the sensor data that is outside a particular range. This may be based on a velocity or acceleration of the vehicle 802, a track of an object, a velocity or acceleration of an object, etc. (e.g., remove a substantial amount of data when traveling relatively slow and remove less data when traveling relatively fast). To illustrate, if the vehicle 802 is traveling at 15 miles per hour, and no vehicles are traveling towards the autonomous vehicle 102, the data processing component(s) may remove data that is 200 feet away, since this data is likely not needed to evaluate a trajectory or identify a potential imminent collision. In another example, the data processing component(s) may remove data from the sensor data based on a type of environment in which the vehicle 802 is located. For example, if the vehicle 802 is in an urban area with multiple vehicles, roads, road intersections, etc., the data processing component(s) may not remove data from the sensor data (or remove a limited amount). However, if the vehicle 802 is in a rural area or sparse region of an urban environment with relatively few vehicles, roads, road intersections, etc., the data processing component(s) may remove more data from the sensor data. In examples, reducing the amount of the sensor data may allow the second system 806 that may process the reduced sensor data to operate more quickly (e.g., process less data, resulting in reduced compute time).

EXAMPLE CLAUSES

A. A vehicle system comprising: a first system comprising one or more first processors and one or more first memories comprising instructions that, when executed by the one or more first processors, cause the one or more first processors to: receive sensor data from one or more sensors; and generate, based at least in part on the sensor data, a first trajectory for an autonomous vehicle and a second trajectory for the autonomous vehicle; and a second system comprising one or more second processors and one or more second memories comprising instructions that, when executed by the one or more second processors, cause the one or more second processors to: receive the first trajectory and the second trajectory from the first system; receive at least a portion of the sensor data; determine, based at least in part on the at least the portion of the sensor data, an object in an environment; determine an object trajectory for the object; perform first collision detection with the first trajectory and the object trajectory to determine a first state associated with the first trajectory; perform second collision detection with the second trajectory and the object trajectory to determine a second state associated with the second trajectory; determine, based at least in part on the first state and the second state, a third trajectory for the autonomous vehicle, the third trajectory comprising at least one of the first trajectory, the second trajectory, or a fourth trajectory generated by the second system; and control the autonomous vehicle based at least in part on the third trajectory.

B. The vehicle system of example A, wherein: the first collision detection comprises determining whether or not the vehicle would collide with the object based at least in part on the first trajectory and the object trajectory; and the second collision detection comprises determining whether or not the vehicle would collide with the object based at least in part on the second trajectory and the object trajectory.

C. The vehicle system of example A or B, wherein: the first state indicates that the first trajectory is associated with an estimated collision; and the one or more second memories of the second system further comprise instructions that, when executed by the one or more second processors, cause the one or more second processors to: send, to the first system and based at least in part on the first state, a message indicating one or more of a time to collision, the extents of the object, a velocity of the object, a location of the object, or a point of collision.

D. The vehicle system of any of examples A through C, wherein: at least one of the first state indicates that the first trajectory is associated with a first estimated collision or the second state indicates that the second trajectory is associated with a second estimated collision; the third trajectory comprises at least one of the second trajectory or the fourth trajectory; and the one or more second memories of the second system further comprise instructions that, when executed by the one or more second processors, cause the one or more second processors to: maintain control of the autonomous vehicle based at least in part on the third trajectory; receive a signal to release control of the autonomous vehicle from the third trajectory; receive a fifth trajectory from the first system; and control the autonomous vehicle based at least in part on the fifth trajectory and the signal.

E. A method comprising: receiving, from a first component, a first trajectory for a vehicle and a second trajectory for the vehicle; receiving, by a second component, at least a portion of sensor data; determining, by the second component and based at least in part on the at least the portion of the sensor data, an object in an environment; identifying, by the second component and based at least in part on the at least the portion of the sensor data, an object trajectory of the object; performing, by the second component, one or more first validation operations with the first trajectory to determine a first state associated with the first trajectory; performing, by the second component, one or more second validation operations with the second trajectory to determine a second state associated with the second trajectory; determining, by the second component and based at least in part on the first state and the second state, a third trajectory for the vehicle, the third trajectory comprising at least one of the first trajectory, the second trajectory, or a fourth trajectory generated by the second component; and controlling the vehicle based at least in part on the third trajectory.

F. The method of example E, wherein performing the one or more first validation operations comprises at least one of: determining whether the first trajectory was generated less than a threshold amount of time from a current time; determining whether the first trajectory is consistent with a current or previous pose of the vehicle; determining whether the first trajectory is compatible with a capability of the vehicle; or determining whether the vehicle moving along the first trajectory will collide with the object moving along the object trajectory.

G. The method of example E or F, wherein performing the one or more second validation operations comprises at least one of: determining whether the second trajectory was generated less than a threshold amount of time from a current time; determining whether the second trajectory is consistent with a current or previous pose of the vehicle; determining whether the second trajectory is compatible with a capability of the vehicle; or determining whether the vehicle moving along the second trajectory will collide with the object moving along the object trajectory.

H. The method of any of examples E through G, wherein the first state indicates that the first trajectory is invalid and the second state indicates that the second trajectory is invalid, the method further comprises: generating, by the second component and based at least in part on the second trajectory, the fourth trajectory, the fourth trajectory comprising a modification of the second trajectory; and performing, by the second component, one or more third validation operations with the fourth trajectory and the object trajectory to determine a third state associated with the fourth trajectory, the third state indicating that the fourth trajectory is valid; wherein determining the third trajectory for the vehicle comprises determining, as the third trajectory and based at least in part on the third state, the fourth trajectory.

I. The method of any of examples E through H, wherein the first state indicates that the first trajectory is invalid and the second state indicates that the second trajectory is invalid, the method further comprises: generating, by the second component and based at least in part on the second trajectory, a fifth trajectory, the fifth trajectory comprising a modification of the second trajectory; performing, by the second component, one or more third validation operations with the fifth trajectory and the object trajectory to determine a third state associated with the fifth trajectory, the third state indicating that the fifth trajectory is invalid; and generating, by the second component, the fourth trajectory, the fourth trajectory being associated with a maximum deceleration rate, wherein determining the third trajectory comprises determining, as the third trajectory and based at least in part on the third state, the fourth trajectory.

J. The method of any of examples E through I, wherein: generating the fifth trajectory comprises modifying the second trajectory one or more times up to a limit to generate the fifth trajectory; and performing the one or more third validation operations comprises performing the one or more third validation operations with the modified fifth trajectory less than a number of times, and the method further comprises: determining that the number of times is met; wherein generating the fourth trajectory is based at least in part on determining that the number of times is met.

K. The method of any of examples E through J, further comprising: sending a signal to one or more components of the vehicle to at least one of pre-tension a seatbelt or prepare an airbag for deployment.

L. The method of any of examples E through K, wherein the first state indicates that the first trajectory is invalid and the second state indicates that the second trajectory is invalid, the method further comprises: generating, by the second component and based at least in part on the second trajectory, the fourth trajectory by applying a maximum amount of modification to the second trajectory; performing, by the second component, one or more third validation operations with the fourth trajectory and the object trajectory to determine a third state associated with the fourth trajectory, the third state indicating that the fourth trajectory is invalid; and determining that the third state indicates that the fourth trajectory is invalid; wherein determining the third trajectory comprises determining, as the third trajectory and based at least in part on the third state, the fourth trajectory.

M. The method of any of examples E through L, wherein determining the third trajectory comprises at least one of: selecting, as the third trajectory, the first trajectory when the first state indicates that the first trajectory is associated with an estimated collision in more than a threshold amount of time or is collision free; selecting, as the third trajectory, the second trajectory when the first state indicates that the first trajectory is associated with an estimated collision in less than a threshold amount of time and the second state indicates that the second trajectory is collision free; or selecting, as the third trajectory, the fourth trajectory when the first state indicates that the first trajectory is associated with a first estimated collision in less than a threshold amount of time and the second state indicates that the second trajectory is associated with a second estimated collision.

N. One or more non-transitory computer-readable media storing instructions that, when executed, cause one or more processors to perform acts comprising: receiving, from a first system, a first trajectory for a vehicle and a second trajectory for the vehicle; determining a first state indicative of whether the first trajectory is associated with a first collision; determining a second state indicative of whether the second trajectory is associated with a second collision; determining a third trajectory for the vehicle based at least in part on the second trajectory and the second state; determining, based at least in part on the first state and the second state, a fourth trajectory for the vehicle, the fourth trajectory comprising at least one of the first trajectory, the second trajectory, or the third trajectory; and controlling the vehicle based at least in part on the fourth trajectory.

O. The one or more non-transitory computer-readable media of example N, wherein determining the first state indicative of whether the first trajectory is associated with the first collision comprises determining that the first trajectory is associated with the first collision, and the acts further comprise: sending, to the first system, a message comprising one or more of a time to collision, a location of the collision, an object position associated with the collision, an object velocity associated with the collision, or an object size associated with the collision.

P. The one or more non-transitory computer-readable media of examples N or O, wherein the fourth trajectory comprises at least one of the second trajectory or the third trajectory, and the acts further comprise: maintaining control of the vehicle based at least in part on the fourth trajectory; receiving a signal to release control of the vehicle from the fourth trajectory; receiving a fifth trajectory; and controlling the vehicle based at least in part on the fifth trajectory and the signal.

Q. The one or more non-transitory computer-readable media of any of examples N through P, wherein the signal to release control of the vehicle from the fourth trajectory is received from at least one of a teleoperations system or another system.

R. The one or more non-transitory computer-readable media of any of examples N through Q, wherein: determining the first state indicative of whether the first trajectory is associated with the first collision comprises determining that the first trajectory is associated with the first collision; and determining the second state indicative of whether the second trajectory is associated with the second collision comprises determining that the second trajectory is associated with the second collision, and the acts further comprise: generating, based at least in part on the second trajectory, a fifth trajectory, the fifth trajectory comprising a modification to the second trajectory; determining that the fifth trajectory is associated with at least one of the first collision, the second collision, or a third collision; and generating the third trajectory, the third trajectory being associated with a maximum deceleration rate, wherein determining the fourth trajectory comprises determining, as the fourth trajectory, the third trajectory based at least in part on determining that the fifth trajectory is associated with at least one of the first collision, the second collision, or the third collision.

S. The one or more non-transitory computer-readable media of any of examples N through R, wherein: generating the fifth trajectory comprises modifying the second trajectory one or more times up to a limit to generate the fifth trajectory; and determining that the fifth trajectory is associated with at least one of the first collision, the second collision, or the third collision is based at least in part on the fifth trajectory, and the acts further comprising: determining that the limit is met; wherein generating the third trajectory is based at least in part on determining that the limit is met.

T. The one or more non-transitory computer-readable media of any of examples N through S, wherein the acts further comprise: monitoring one or more of the first system or a component of the vehicle; and determining, based at least in part on the monitoring, that an error has occurred; wherein determining the fourth trajectory comprises determining, as the fourth trajectory, at least one of the second trajectory or the third trajectory based at least in part on the error.

While the example clauses described above are described with respect to particular implementations, it should be understood that, in the context of this document, the content of the example clauses can be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A vehicle system comprising:
a first system comprising one or more first processors and one or more first memories comprising instructions that, when executed by the one or more first processors, cause the one or more first processors to:
 receive sensor data from one or more sensors; and
 generate, based at least in part on the sensor data, a first trajectory for an autonomous vehicle and a second trajectory for the autonomous vehicle; and
a second system comprising one or more second processors and one or more second memories comprising instructions that, when executed by the one or more second processors, cause the one or more second processors to:
 receive the first trajectory and the second trajectory from the first system;
 receive at least a portion of the sensor data;
 determine, based at least in part on the at least the portion of the sensor data, an object in an environment;
 determine an object trajectory for the object;
 perform first collision detection with the first trajectory and the object trajectory to determine a first state associated with the first trajectory, wherein the first collision detection comprises determining whether or not the vehicle would collide with the object based at least in part on the first trajectory and the object trajectory;
 perform second collision detection with the second trajectory and the object trajectory to determine a second state associated with the second trajectory, wherein the second collision detection comprises determining whether or not the vehicle would collide with the object based at least in part on the second trajectory and the object trajectory;
 determine, based at least in part on the first state and the second state, a third trajectory for the autonomous vehicle, the third trajectory comprising at least one of the first trajectory, the second trajectory, or a fourth trajectory generated by the second system; and
 control the autonomous vehicle based at least in part on the third trajectory.

2. The vehicle system of claim 1, wherein:
the first state indicates that the first trajectory is associated with an estimated collision; and
the one or more second memories of the second system further comprise instructions that, when executed by the one or more second processors, cause the one or more second processors to:
 send, to the first system and based at least in part on the first state, a message indicating one or more of a time to collision, extents of the object, a velocity of the object, a location of the object, or a point of collision.

3. The vehicle system of claim 1, wherein:
at least one of the first state indicates that the first trajectory is associated with a first estimated collision or the second state indicates that the second trajectory is associated with a second estimated collision;
the third trajectory comprises at least one of the second trajectory or the fourth trajectory; and
the one or more second memories of the second system further comprise instructions that, when executed by the one or more second processors, cause the one or more second processors to:
 maintain control of the autonomous vehicle based at least in part on the third trajectory;
 receive a signal to release control of the autonomous vehicle from the third trajectory;
 receive a fifth trajectory from the first system; and
 control the autonomous vehicle based at least in part on the fifth trajectory and the signal.

4. A method comprising:
receiving, from a first component, a first trajectory for a vehicle and a second trajectory for the vehicle;
receiving, by a second component, at least a portion of sensor data;
determining, by the second component and based at least in part on the at least the portion of the sensor data, an object in an environment;
identifying, by the second component and based at least in part on the at least the portion of the sensor data, an object trajectory of the object;

performing, by the second component, one or more first validation operations with the first trajectory to determine a first state associated with the first trajectory, wherein performing the one or more first validation operations comprises at least determining whether the vehicle moving along the first trajectory will collide with the object moving along the object trajectory;

performing, by the second component, one or more second validation operations with the second trajectory to determine a second state associated with the second trajectory, wherein performing the one or more second validation operations comprises at least determining whether the vehicle moving along the second trajectory will collide with the object moving along the object trajectory;

determining, by the second component and based at least in part on the first state and the second state, a third trajectory for the vehicle, the third trajectory comprising at least one of the first trajectory, the second trajectory, or a fourth trajectory generated by the second component; and controlling the vehicle based at least in part on the third trajectory.

5. The method of claim 4, wherein performing the one or more first validation operations further comprises at least one of:
determining whether the first trajectory was generated less than a threshold amount of time from a current time;
determining whether the first trajectory is consistent with a current or previous pose of the vehicle; or
determining whether the first trajectory is compatible with a capability of the vehicle.

6. The method of claim 4, wherein performing the one or more second validation operations further comprises at least one of:
determining whether the second trajectory was generated less than a threshold amount of time from a current time;
determining whether the second trajectory is consistent with a current or previous pose of the vehicle; or
determining whether the second trajectory is compatible with a capability of the vehicle.

7. The method of claim 4, wherein the first state indicates that the first trajectory is invalid and the second state indicates that the second trajectory is invalid, the method further comprises:
generating, by the second component and based at least in part on the second trajectory, the fourth trajectory, the fourth trajectory comprising a modification of the second trajectory; and
performing, by the second component, one or more third validation operations with the fourth trajectory and the object trajectory to determine a third state associated with the fourth trajectory, the third state indicating that the fourth trajectory is valid,
wherein determining the third trajectory for the vehicle comprises determining, as the third trajectory and based at least in part on the third state, the fourth trajectory.

8. The method of claim 4, wherein the first state indicates that the first trajectory is invalid and the second state indicates that the second trajectory is invalid, the method further comprises:
generating, by the second component and based at least in part on the second trajectory, a fifth trajectory, the fifth trajectory comprising a modification of the second trajectory;

performing, by the second component, one or more third validation operations with the fifth trajectory and the object trajectory to determine a third state associated with the fifth trajectory, the third state indicating that the fifth trajectory is invalid; and generating, by the second component, the fourth trajectory, the fourth trajectory being associated with a maximum deceleration rate, wherein determining the third trajectory comprises determining, as the third trajectory and based at least in part on the third state, the fourth trajectory.

9. The method of claim 8, wherein:
generating the fifth trajectory comprises modifying the second trajectory one or more times up to a limit to generate the fifth trajectory; and
performing the one or more third validation operations comprises performing the one or more third validation operations with the fifth trajectory less than a number of times, and the method further comprises:
determining that the number of times is met,
wherein generating the fourth trajectory is based at least in part on determining that the number of times is met.

10. The method of claim 8, further comprising:
sending a signal to one or more components of the vehicle to at least one of pre-tension a seatbelt or prepare an airbag for deployment.

11. The method of claim 4, wherein the first state indicates that the first trajectory is invalid and the second state indicates that the second trajectory is invalid, the method further comprises:
generating, by the second component and based at least in part on the second trajectory, the fourth trajectory by applying a maximum amount of modification to the second trajectory;
performing, by the second component, one or more third validation operations with the fourth trajectory and the object trajectory to determine a third state associated with the fourth trajectory, the third state indicating that the fourth trajectory is invalid; and
determining that the third state indicates that the fourth trajectory is invalid,
wherein determining the third trajectory comprises determining, as the third trajectory and based at least in part on the third state, the fourth trajectory.

12. The method of claim 4, wherein determining the third trajectory comprises at least one of:
selecting, as the third trajectory, the first trajectory when the first state indicates that the first trajectory is associated with an estimated collision in more than a threshold amount of time or is collision free;
selecting, as the third trajectory, the second trajectory when the first state indicates that the first trajectory is associated with an estimated collision in less than a threshold amount of time and the second state indicates that the second trajectory is collision free; or
selecting, as the third trajectory, the fourth trajectory when the first state indicates that the first trajectory is associated with a first estimated collision in less than a threshold amount of time and the second state indicates that the second trajectory is associated with a second estimated collision.

13. One or more non-transitory computer-readable media storing instructions that, when executed, cause one or more processors to perform acts comprising:
receiving, from a first system, a first trajectory for a vehicle and a second trajectory for the vehicle;

determining a first state indicative of whether the first trajectory is associated with a first collision with an object, based at least in part on the first trajectory and an object trajectory of the object;

determining a second state indicative of whether the second trajectory is associated with a second collision with the object based at least in part on the second trajectory and the object trajectory;

determining a third trajectory for the vehicle based at least in part on the second trajectory and the second state;

determining, based at least in part on the first state and the second state, a fourth trajectory for the vehicle, the fourth trajectory comprising at least one of the first trajectory, the second trajectory, or the third trajectory; and controlling the vehicle based at least in part on the fourth trajectory.

14. The one or more non-transitory computer-readable media of claim 13, wherein determining the first state indicative of whether the first trajectory is associated with the first collision comprises determining that the first trajectory is associated with the first collision, and the acts further comprise:

sending, to the first system, a message comprising one or more of a time to collision, a location of the collision, an object position associated with the collision, an object velocity associated with the collision, or an object size associated with the collision.

15. The one or more non-transitory computer-readable media of claim 13, wherein the fourth trajectory comprises at least one of the second trajectory or the third trajectory, and the acts further comprise:

maintaining control of the vehicle based at least in part on the fourth trajectory;

receiving a signal to release control of the vehicle from the fourth trajectory;

receiving a fifth trajectory; and controlling the vehicle based at least in part on the fifth trajectory and the signal.

16. The one or more non-transitory computer-readable media of claim 15, wherein the signal to release control of the vehicle from the fourth trajectory is received from at least one of a teleoperations system or another system.

17. The one or more non-transitory computer-readable media of claim 13, wherein:

determining the first state indicative of whether the first trajectory is associated with the first collision comprises determining that the first trajectory is associated with the first collision; and determining the second state indicative of whether the second trajectory is associated with the second collision comprises determining that the second trajectory is associated with the second collision, and the acts further comprise:

generating, based at least in part on the second trajectory, a fifth trajectory, the fifth trajectory comprising a modification to the second trajectory;

determining that the fifth trajectory is associated with at least one of the first collision, the second collision, or a third collision; and generating the third trajectory, the third trajectory being associated with a maximum deceleration rate, wherein determining the fourth trajectory comprises determining, as the fourth trajectory, the third trajectory based at least in part on determining that the fifth trajectory is associated with at least one of the first collision, the second collision, or the third collision.

18. The one or more non-transitory computer-readable media of claim 17, wherein:

generating the fifth trajectory comprises modifying the second trajectory one or more times up to a limit to generate the fifth trajectory; and determining that the fifth trajectory is associated with at least one of the first collision, the second collision, or the third collision is based at least in part on the fifth trajectory, and the acts further comprising:

determining that the limit is met, wherein generating the third trajectory is based at least in part on determining that the limit is met.

19. The one or more non-transitory computer-readable media of claim 13, wherein the acts further comprise:

monitoring one or more of the first system or a component of the vehicle; and determining, based at least in part on the monitoring, that an error has occurred, wherein determining the fourth trajectory comprises determining, as the fourth trajectory, at least one of the second trajectory or the third trajectory based at least in part on the error.

20. The one or more non-transitory computer-readable media of claim 13, wherein the acts further comprise:

receiving sensor data;

determining, based at least in part on the sensor data, the object in an environment of the vehicle; and determining the object trajectory.

* * * * *